(12) United States Patent
Suer et al.

(10) Patent No.: US 6,431,439 B1
(45) Date of Patent: Aug. 13, 2002

(54) SYSTEM AND METHOD FOR THE ELECTRONIC STORAGE AND TRANSMISSION OF FINANCIAL TRANSACTIONS

(75) Inventors: Myles P. Suer, San Ramon; David Sommers, Castro Valley; Howard Stanley, San Jose, all of CA (US)

(73) Assignee: Personal Solutions Corporation, Danville, CA (US)

( * ) Notice: Subject to any disclaimer, the term of this patent is extended or adjusted under 35 U.S.C. 154(b) by 0 days.

(21) Appl. No.: 09/121,252

(22) Filed: Jul. 23, 1998

Related U.S. Application Data
(60) Provisional application No. 60/053,582, filed on Jul. 24, 1997.

(51) Int. Cl.[7] ................................................. G06K 5/00
(52) U.S. Cl. .................... 235/380; 235/382; 235/472.02
(58) Field of Search ................................. 235/380, 379, 235/382, 383, 385, 472.01, 472.02, 487; 902/3, 5, 18, 30

(56) References Cited

U.S. PATENT DOCUMENTS

| | | | | | |
|---|---|---|---|---|---|
| 4,386,266 | A | * | 5/1983 | Chesarek | 235/380 |
| 4,417,136 | A | * | 11/1983 | Rushby et al. | 235/379 |
| 4,737,911 | A | * | 4/1988 | Freeman, Jr. | 235/379 X |
| 5,195,133 | A | * | 3/1993 | Kapp et al. | 235/380 X |
| 5,233,547 | A | * | 8/1993 | Kapp et al. | 235/380 X |
| 5,297,202 | A | * | 3/1994 | Kapp et al. | 235/380 X |
| 5,337,263 | A | * | 8/1994 | Patermaster | 235/380 X |
| 5,465,038 | A | * | 11/1995 | Register | 235/375 X |
| 5,594,226 | A | * | 1/1997 | Steger | 235/379 |
| 5,602,380 | A | * | 2/1997 | Bishay | 235/472.01 |

* cited by examiner

*Primary Examiner*—Michael G Lee
(74) *Attorney, Agent, or Firm*—Steins & Associates

(57) ABSTRACT

An information storage and transmission device which captures handwritten and digital data relating to various financial transactions and stores the information when the transactions are made. The device can then wirelessly transmit this information to different terminal units, such as host PCs, ATMs, or terminal units used for point-of-sale transactions in order to facilitate the financial transaction and help a user track his financial transactions in an easier manner.

5 Claims, 26 Drawing Sheets

MAY 05, 1997     CHK 0505
AMT $_ _ _ _ _ _   BAL $1535.97

FIGURE 15A

MAY 05, 1997     CHK 0505
AMT $_ 125.75   BAL $1410.22

FIGURE 15B

MAY 05, 1997     CHK 0505
CAT: FOOD     BAL $1410.22

FIGURE 15C

```
MAY 05, 1997    DEP 011
AMT $_____    BAL $1410.22
```

FIGURE 16A

```
MAY 05, 1997    DEP 011
AMT $_ 125.75   BAL $1535.97
```

FIGURE 16B

```
MAY 05, 1997    DEP 011
CAT: MY PAY     BAL $1535.97
```

FIGURE 16C

MAY 05, 1997     ATM W/D
AMT $_ _ _ _ _   BAL $1,535.97

FIGURE 17A

MAY 05, 1997     ATM W/D
AMT $_120.00     BAL $1415.97

FIGURE 17B

MAY 05, 1997     IRDA MODE
WAITING

FIGURE 18A

MAY 05, 1997     IRDA MODE
TRANSFERRING

FIGURE 18B

MAY 05, 1997     IRDA MODE
  * * * DONE * * *

FIGURE 18C

MAY 05, 1997    TIP
BILL $_ _ _ _   15%  $_ _ _ _ _

FIGURE 19A

MAY 05, 1997     TIP $18.23
BILL $121.50  15%  $139.73

FIGURE 19B

MAY 05, 1997     TIP $14.58
BILL $121.50  12%  $136.08

FIGURE 19C

MAY 05, 1997    CALC

FIGURE 20A

MAY 05, 1997    CALC
        153 X 7.4 = 1,132.2

FIGURE 20B

MAY 05, 1997    PIN _ _ _ _ _

FIGURE 21A

MAY 05, 1997    PIN * * * * *
BAT 58%  MEM 09%  BAL $1,535.97

FIGURE 21B

```
Acct: Checking Bal: $500.49
       +/- and Enter
```

FIGURE 22A

```
       $123.00
    Change or Enter
```

FIGURE 22B

```
  Transaction Completed
       and Recorded
```

FIGURE 22C

SYSTEM AND METHOD FOR THE ELECTRONIC STORAGE AND TRANSMISSION OF FINANCIAL TRANSACTIONS

This application claims benefit of Provisional Application No. 60/053,582 filed Jul. 24, 1997.

Background of the Invention

This invention relates to an information storage and transmission system, and more specifically to a method and system for storing financial transactions in a portable unit for later transmission to a terminal unit, such as a personal computer, an automatic teller machine (ATM), or a terminal used for other transactions, such as a terminal at a department store used for point-of-sale transactions.

Over the past few years, more and more people and businesses have begun using personal computers to run software accounting applications that record and organize their financial transactions. These accounting systems, such as Quicken and Excel, can organize a person's finances by, for example, establishing different accounts based on debits and credits, personal and business expenses, or tax and non-tax expenditures. Various accounts may be established which include credit card accounts, checking accounts, asset accounts (e.g., stocks and real estate), and liability accounts (e.g., mortgage and other payable loans). After these accounts have been established and data inputted into them, the user of these accounting packages can generate charts and graphs that track the user's expenditures and help the user plan payment schedules and investment strategies.

In order to effectively use these software accounting applications, consumers need to keep accurate records of their daily financial transactions. In today's era of multiple different financial transactions, such as telebanking, ATM transactions, credit card transactions, and checking transactions, it has become increasingly difficult for a user to keep an accurate paper record of all of his financial transactions. In addition, even if a user was able to keep a paper copy of all of the deposit slips, ATM receipts, sales receipts, and check registers, he must still type all of this information into the software accounting program to make use of the tools provided by the software accounting program.

For example, when a user writes a check, he must write down the information about the check, such as the check number, the date, the payee, and the amount in a checkbook. Then, when running the software accounting program, the user must input all of this data about the check into the personal computer running the software accounting program. Only after this information is entered into the program to reflect all of the activity in his account can the software package give meaningful information to the user, such as an accurate account balance, a chart showing actual expenditures for a given month a given item, or a table showing, for example, taxable and non-taxable income to date.

Most users are equally interested in tracking other financial transactions in addition to check writing. For example, when a user deducts money from his account using an ATM machine, he would also like to record that transaction. As described above, the user may again desire to input this data into the software accounting program on his personal computer so the accounting program can produce graphical and tabular data about his finances. Once again the user must manually input the data relating to the ATM transaction, such as the account number and the amount of the withdrawal, into the software accounting package. In addition, when a user travels to a department store, he may wish to make a note of any credit-card transactions and record these transactions so that he can manually enter the transactions into his software accounting program. A user must also record financial information at a point-of-sale, e.g., a store or other place of business. For the same reasons discussed above, the user may wish to electronically record this information so that he can later transfer it to a host PC or other terminal unit. In addition, a user may wish to purchase items from a vendor who demands immediate payment. The vendor may also, for example, not wish to pay merchant fees associated with a credit card or other transaction method that does not immediately transfer funds to his account.

The repetitive nature of this method of manual financial transaction record keeping is easily seen by the following example. First, the user must find his checkbook register in which he wrote the information about the check. The user then must type in a password to the accounting software to identify himself as an authorized user and thus grants him access to the financial data. Once the accounting software has verified the user's identity, the user must go to the appropriate data fields in the software application and manually enter the financial transaction information, such as the date of the check, the check number, a transaction code (e.g., debit), the amount of the check, and the name of the person the check was made out to (e.g., payee). Although the user wrote down all of this information in the checkbook when he wrote the check, he must manually enter it into the computer using the computer keyboard. He must then repeat the manual entry of data for each check that he wrote since he last entered a transaction into the program. The repetitive task of entering these transactions into a personal computer (PC) is even more complicated when several different checking accounts are used.

Some conventional products allow a user to electronically record only some information about their financial transactions. For example, some of these products may keep a running account balance. These products do not store important information about each transaction, such as the check number, payee, or category (i.e., a transaction code), that allow the user to summarize and keep a separate running balance for each category. These conventional systems also do not allow the financial information they store to be easily electronically transferred to an accounting software application.

Other conventional hardware products which include an accounting system include personal digital assistants (PDAs) and organizers. The PDAs are handheld computer-based systems which are programmed to run a variety of applications programs, such as Pocket Quicken. To access the accounting system on these devices, the user must press a series of keys on a keypad or use an expensive touch screen to scroll through a list of options. After selecting the accounting program, the user may manual input his account and financial transaction information using a miniature keypad. As discussed below, these devices do not allow the financial information stored on them to be easily transferred to a PC or other system for later processing.

Other hardware products use read only memory (ROM) devices to store their applications so that the programs which are stored on these products cannot be easily changed or updated. Like the PDAs described above, these products also run software accounting applications like Pocket Quicken. These products, like PDAs also require that the user manually input all of the financial data using a keypad. In addition, these products also do not allow information stored on them to be easily transferred to a PC or other system for later processing. Therefore, it is desirable to provide a system and method for electronically entering handwritten and digital data about a plurality of financial transactions into a handheld computer which may be integrated with other financial data recorders, such as a checkbook, to limit the number of items a user must carry when making financial transactions.

Once a user has stored information about financial transactions in a handheld unit, he may want to transfer this information to a terminal unit, which may be a PC, an ATM, or any other terminal unit. If the terminal unit is connected to a relational database, it can provide many accounting capabilities to non-PC users. In addition, it is advantageous to enter financial transactions information into a PC for several reasons. The PC generally has more processing power and can run accounting application programs, like Quicken or Excel, more quickly and efficiently than a hand-held accounting system. A PC is also more easily connected (and in fact may be permanently connected) to other PCs over a network and can share information and programs among many systems and users. In addition, a PC has more memory and can store more application programs which allows the financial transaction information to be manipulated by different software applications. The additional memory means that the memory does not have to be constantly dumped to accommodate more data, as with portable accounting systems. Thus, PCs are needed if accounting systems are to be used to their full advantage, and the ability to transfer financial transaction data to PCs is an unavoidable part of high-powered accounting systems.

In general, neither PDAs nor financial accounting hardware products allow the user to easily transfer information stored on them to the PC or other terminal unit. In most instances, the user must attach a cable to the hardware product and the PC or other terminal unit, and then enter a series of commands on the product's keypad. The product then transmits the data. After the data has been transferred, the user must detach the cable from the product and the PC or other terminal unit. Some products can accommodate data transfer between themselves and a PC or another terminal unit using an infrared (IR) adapter to wirelessly link the product to the PC similar to a television remote control unit but the user must enter a series of instructions to transmit the data.

Therefore, it is desirable to provide a portable, hand-held accounting system that wirelessly and automatically transfers information to a remote terminal for processing which avoids the above problems of conventional systems. It is to this end that the present invention is directed.

SUMMARY OF THE INVENTION

The invention provides a hand-held device that allows a user to record financial transactions information and make an electronic record of the transaction. Using the invention, the user can electronically store information about a check transaction while writing the check. The invention achieves this result by providing a keypad to enter digital data, such as the check number and the amount, and store it into the device's memory. The invention also provides a checkwriting surface that supports a check as it is being filled out by the user, that captures the handwritten payee information as it is being written, and that stores the payee information in a bit-map format in the device's memory. The bit-map may be generated when a pen, having both an ink cartridge and a transmitter, traverses the payee field on the check, which is located above a grid in the device that receives a signal generated by the pen. A bit map is then generated from the portion of the grid traversed by the pen. The bit map may be stored, for example, in a compressed format, such as Tag Image File Format (TIFF), to conserve memory. The grid that captures the payee portion of the check is small, thus minimizing the size and cost of the device.

In another aspect of this invention, the portable hand-held device may automatically grant an accounting software program, such as Quicken, access to the financial transaction information in the device to manipulate the digital data and the image of the handwritten data in the form of X-Y coordinates using accounting software stored in the device. The program is automatically invoked so that the user does not have to scroll through menus or use the keypad to start the program which saves the user time and makes the device more user friendly than other systems.

Because the device captures an image of the handwritten payee information in the form of X-Y coordinates, an alphabetic keypad with its additional 26 keys is not required which makes the device smaller than devices requiring an alphabetic keypad to input data. In addition, the device has an internal clock to record the date and time of the transaction, and a counter to update the next check to be written in the sequence of checks so that the device automatically updates these numbers for each check and the user has less information to input when recording a checking transaction.

In another aspect of the invention, the device may comprise a transceiver, e.g., such as an infrared (IR) transceiver, for wireless communication between the device and a terminal unit, such as a personal computer, an ATM, or a terminal at a merchant's site. An IR adapter may be plugged into the terminal unit's serial, parallel, Universal Serial Bus (USB), or IrDA port to receive data from the device. The device can thus, for example, transfer information about a financial transaction to accounting programs running on the PC. Because the IR adapter is part of the device, a separate cable does not have to be attached to and removed from the device. This allows the user to more quickly and easily communicate with the terminal unit.

The device may also allow point-of-sale transactions in which the device can be used to transmit user account data to the point-of-sale terminal to automatically transfer money from the user's banking account or other financial account to a merchant's account. The same device can use its IR connection to implement a point-of-sale transaction so that money is automatically debited from a checking or credit account. The user can thus purchase products from merchants without having to exchange paper, and the user and the merchant can both retain a complete digital record of the transaction. Additionally, because checking transactions may be fed into already existing check truncation software, it is possible for the transaction to be transmitted electronically from the user's account directly to the merchant's financial system. Thus, check truncation has the potential of dramatically reducing the handling costs of the merchant and the banks associated with a checking transaction.

To transfer money to a merchant's account, the device may transfer an encrypted signature, the selected account information, and the latest lock step code to a terminal unit at the vendor's location, which then transfers the information to a checking or credit card processing system. Lock step codes contain encryption keys that are periodically changed so that after a given period, even if the device is lost or stolen, an unauthorized person cannot use the device to access the user's account. Meanwhile, the merchant transfers to the user transaction information including the date, merchant name, the transaction amount, and a category for the transaction.

The signature encryption and verification at the user's bank or financial institution, as well as other verification steps, guard against major checking or credit card fraud, especially when the user's account and the merchant's account can be accessed through existing systems. At the user's financial institution, the image of his handwritten signature is compared to an image stored at the financial institution. If the two images and other account information match, and if the user has sufficient funds in his account, the transaction is approved.

Financial transactions using the above method in accordance with the invention have the additional advantage of providing the merchant with accessible digital records. The merchant can thus easily review transactions which are challenged by a user. By contrast, today the transaction information for the user and the merchant are on paper so that whenever the merchant cannot find a receipt, he must pay a transaction charge to a bank. In addition, for the first time, users have accurate financial records so that they can use a computer or a relational database to instantaneously compare their records with financial service providers.

BRIEF DESCRIPTION OF THE DRAWINGS

FIG. 14 shows an example of the information displayed when an Information Storage Device is powered ON;

FIGS. 15a–c show an example of the information displayed when Information Storage Device is used to input information when writing a check;

FIGS. 16a–c show an example of the information displayed when the Information Storage Device is used to deposit money into an account;

FIGS. 17a–b show an example of the information displayed when the Information Storage Device is used to make a withdrawal from an ATM account;

FIGS. 18a–c show an example of the information displayed when the Information Storage Device is used to transfer information to a terminal unit using the IR adapter;

FIGS. 19a–c show an example of the information displayed when the Information Storage Device is used to calculate a tip;

FIGS. 20a–b show an example of the information displayed when the Information Storage Device is used as a calculator;

FIGS. 21a–b show an example of the information displayed when the Information Storage Device is used to check the balance in an account; and FIGS. 22a–c show an example of the information displayed when the Information Storage Device is used for a point-of-sale transaction.

DETAILED DESCRIPTION OF THE PREFERRED EMBODIMENTS

The invention is generally applicable to an electronic storage and transmission system and device that stores handwritten and digital data about financial transactions when a user writes a check, accesses his deposit or withdraw account, or makes a point-of-sale transaction. It is in this context that the invention will be described. It will be appreciated, however, that the system and method in accordance with this invention has greater utility.

Figure 1:
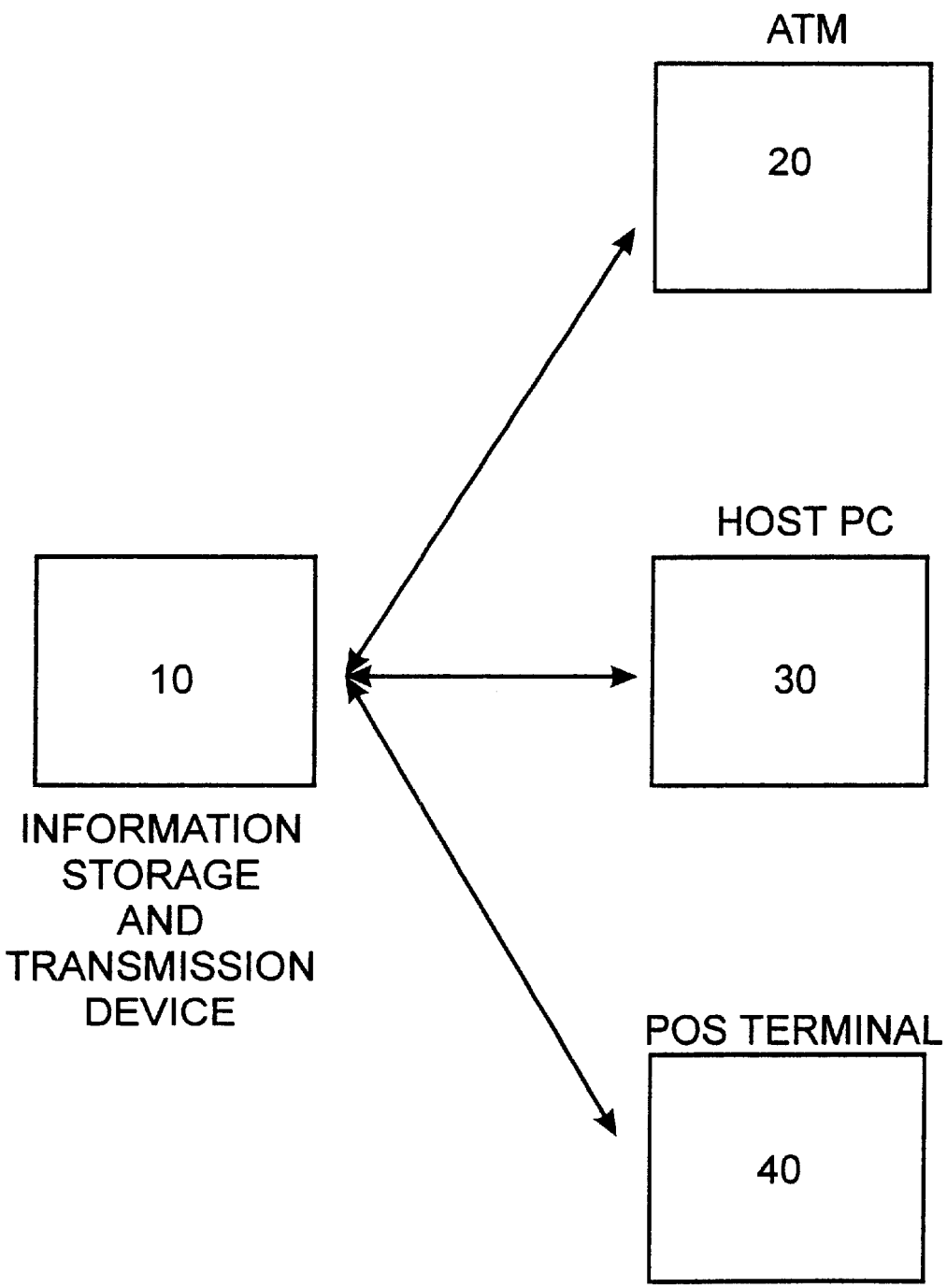
FIG. 1 is block diagram of an Information Storage Device connected to various terminal units in accordance with the invention.

FIG. 1 is a block diagram of a portable, hand-held information storage and transmission device 10 in accordance with the invention that may be connected to a plurality of remote terminal units, such as an automatic teller machine (ATM) 20, a host PC 30, and a point-of-sale terminal 40 located at a merchant's site. The portable, hand-held device may also be referred to as an information storage device. The device 10 may communicate various financial transaction data to and receive similar data from each of these terminal units. In fact, the device 10 may be used with any computer-based system which can communicate data with the device. As discussed more fully below, the user may enter ATM transaction information, such as a personal identification number (PIN) and a transaction amount, into the device 10 and transmit the information from the device 10 to the ATM 20 so that the user may perform ATM functions (e.g., withdraw money, transfer money between accounts, and deposit money) using the device 10. The information about the ATM transaction is also stored on the device 10 so that this information can later be transmitted to a PC or other terminal units for later processing.

As another example, the device 10 may also communicate with the host PC 30. The device 10 may, for example, store all of the financial transactions that a user performed during a predetermined period, such as writing a check, withdrawing money from an ATM 20 or performing a point-of-sale transaction at a point-of-sale terminal 40. The user may then transmit the transaction data to the host PC 30 for use in a financial application program such as Quicken, Money Manager, or Excel.

As another example, the user may use the device 10 for a point-of-sale transaction. The user may wish to immediately transfer money between his account and a merchant's account. To implement a transaction, the user enters a PIN to access his account. Using the device 10, the user can transmit various key user information in order to start the transaction with the point-of-sale terminal 40 which may be connected to the user's bank as opposed to conventional systems which require writing and signing a check, swipping a card and entering a PIN number or providing cash in order to complete a financial transaction. The key user information may include the person's name, personal specifics, a transaction instrument, a lock step code, an encrypted PIN and digital signature, and possibly other biometrics information.

If the merchant's financial institution is connected to a clearing or processing center by a network or some other system, the user's bank can directly transfer funds to the merchant's It account. This point-of-sale transaction may be stored in the device 10 in a transaction record, and can later be transmitted to host PC 30. Thus, the device may electronically record a plurality of financial transactions with a plurality of different terminal units and transmit the recorded transaction data to a computer so that any typical financial planning software package may process the transaction information.

The remote computer system may include or be connected to various systems which help the user of the handheld device 10 manage his/her money. These systems may include data warehousing and data backup systems, an account and data reconciliation system, a synchronization system for synchronizing the device 10 with the remote computer system, bill presentment and bill payment systems, and a system for preparing and printing financial transaction reports. Now, the device 10 will be described in more detail.

Figure 2A:
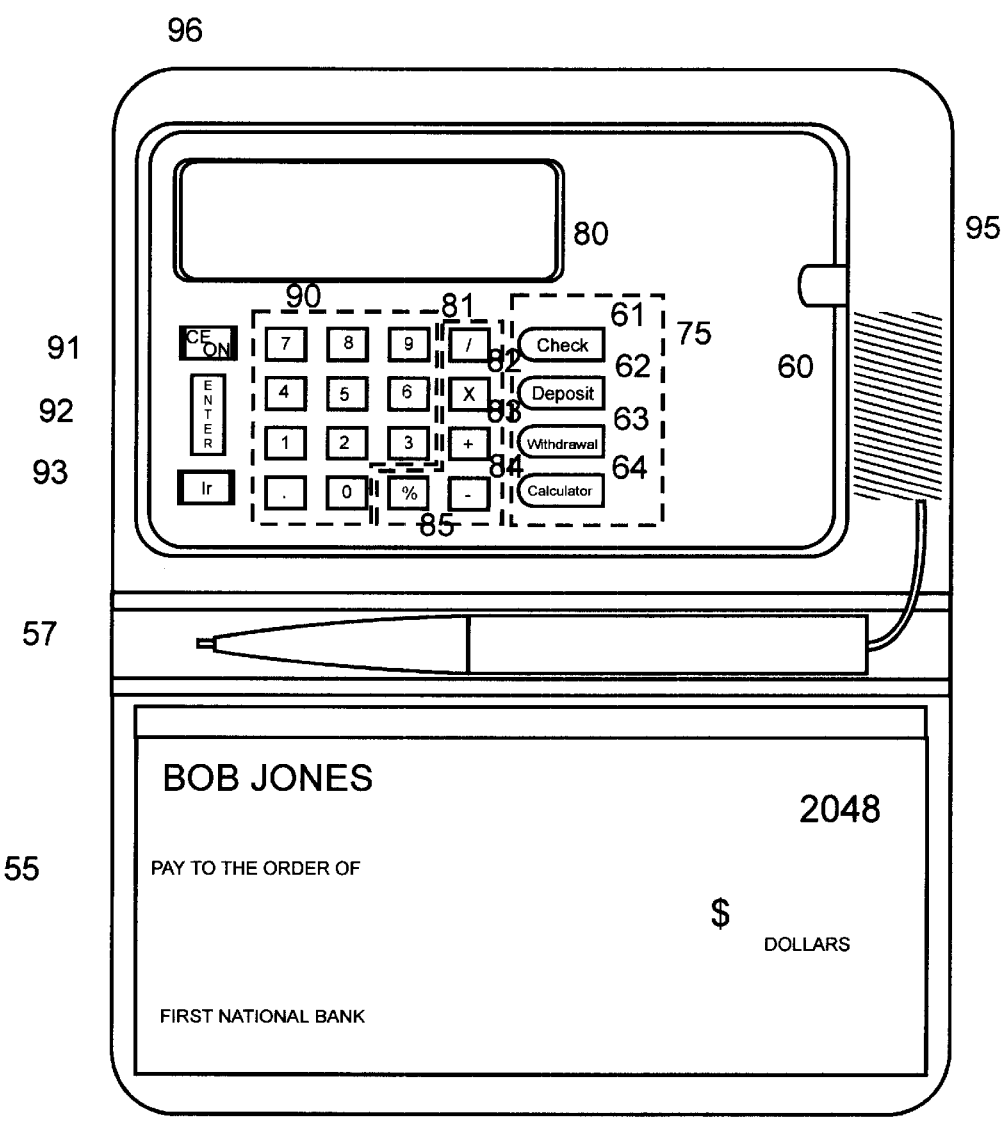
FIGS. 2a–e are diagrams illustrating various embodiments of an Information Storage Device used as an electronic checkbook in accordance with the invention.

FIG. 2a illustrates an example of a portable, hand-held information storage and transmission device 50 in accordance with the present invention. As shown, the information storage device 50 may comprise a writing surface 55 which may support a stack of checks or deposit slips and may electronically capture handwritten information as described below, an electronic pen 57 that has an ink cartridge for writing information on the writing surface and transmitter circuitry (not shown), such as a radio frequency (RF) transmitter and a corresponding receiver in the portable hand-held device 50, used to capture the handwritten information, and a keypad 60. The information storage device 50 may also comprise transmission port 95, for communicating with terminal units, such as a host PC and an output means 96, such as a liquid it crystal display (LCD). Each of these components is described below.

The keypad 60 may include a function keypad 75 for entering information about whether a transaction was for a check (<Check> key 61), a deposit (<Deposit> key 62), or a withdrawal (<Withdrawal> key 63). A function key could also be used to perform simple numerical calculations (<Calculator> key 64). The keypad 60 may also include an operator keypad 80 that may be used to perform simple arithmetic operations such as division using a </> key 81, multiplication using a <x> key 82, addition using a <+↑> key 83, subtraction using a <-↓> key 84, or calculating a percentage using a <%> key 85. The <+↑> key 83 and <-↓> key 84 can also be used for scrolling when, for example, the LCD 96 displays a menu from which the user must make a selection. The keypad 60 may also include a numeric keypad 90 for entering data such as the dollar amount of a check. A <CE/ON> key 91 may be used to turn on the Information Storage Device and to clear entries. An <IR> key 93 may be used to initiate an exchange of information between the Information Storage Device 50 and a remote terminal unit, as described below. An <Enter> key 92 can be used to confirm entries on the keypad 60 and store the entries into a transaction record stored in the memory of the Information Storage Device 50, as discussed below.

To use the Information Storage Device 50 for a check writing transaction, a user may place a check or a paper onto the writing surface 55. The user can then write out a check on the writing surface and an image of a portion of the handwritten data (i.e., such as the payee information) may be electronically captured by the RF circuitry, as described below with reference to FIGS. 4 and 5, used for capturing handwritten data, and stored into a transaction record as described below. The user may next enter digital information regarding the transaction using the numeric keypad 90, such as the amount of a check. The user can then use a transaction key or scroll through a menu to record, in the transaction record, that the transaction was for a particular type of transaction such as FOOD or business. The date and check number are automatically stored in the transaction record because the device 50 have an internal clock and a counter. Therefore, for each check written, an image of the payee information, a check number, a date, an amount and a type of transaction may be stored as a transaction record in the device. The device may store a plurality of these transaction records.

As needed or when the memory in the device 50 is full, the user may transmit this electronic information about the financial transactions to a remote unit, such as a host PC using the transmission port 95 to communicate the data to the remote unit. The transmission port may be an IR communications port. Once downloaded to the host PC, the financial transaction data may be processed by his financial planning program.

Figure 2B:
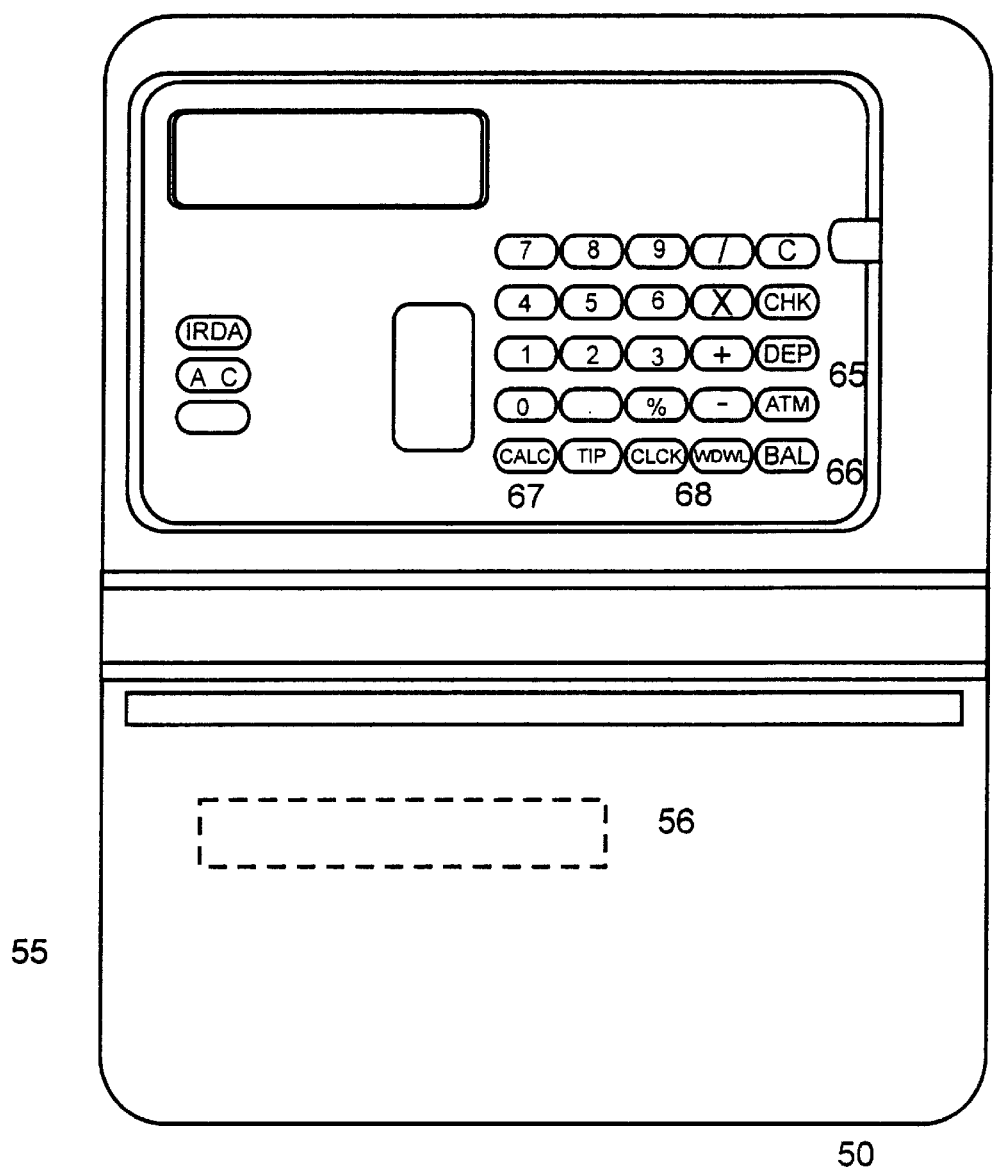

FIG. 2b illustrates an example of a second embodiment of the portable, hand-held information storage and transmission device 50 that may include various components of the device 50 show in FIG. 2A and may further include an <ATM> key 65 for initiating communications with an automatic teller machine, a <Bal> key 66 for causing the device to display the balance in an account, a <Tip> key 67 for causing the device to compute a tip, and a <Clk> key 68 for causing the device to display the time and date. In addition, FIG. 2b shows the checkwriting surface 55 for both embodiments of FIGS. 2a and 2b without checks to illustrate a representative RF image capture area 56 that may be used to capture an image of handwritten information, such as the payee information, of a check. The image capture area 56 may also include multiple image capture areas or a larger image capture area so that an image of multiple types of information, such as notes on the check, may be captured in addition to the payee information. The image capture area 56 will be described below with reference to FIGS. 4 and 5.

Figure 2C:
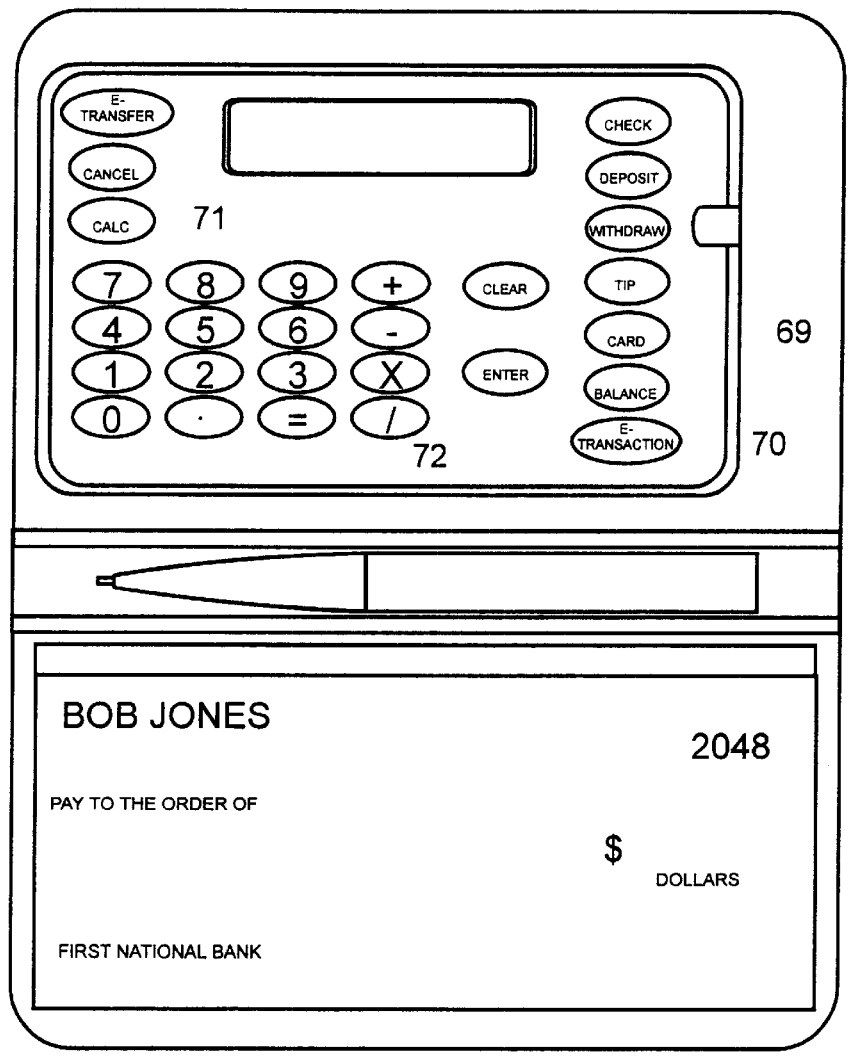

FIG. 2c shows another embodiment of an Information Storage Device 50 that may include the components described above and may also include a <Card> key 69 for permitting 20 the user to enter information about credit card transactions, a <E Transaction> key 70 for automatically transferring financial information to, for example, financial institutions during a point-of-sale transaction, a <Cancel> key 71 for canceling information entered into the Information Storage Device, and a equal <=> key 72, which may be used to compute the results of arithmetic operations.

Figure 2D:
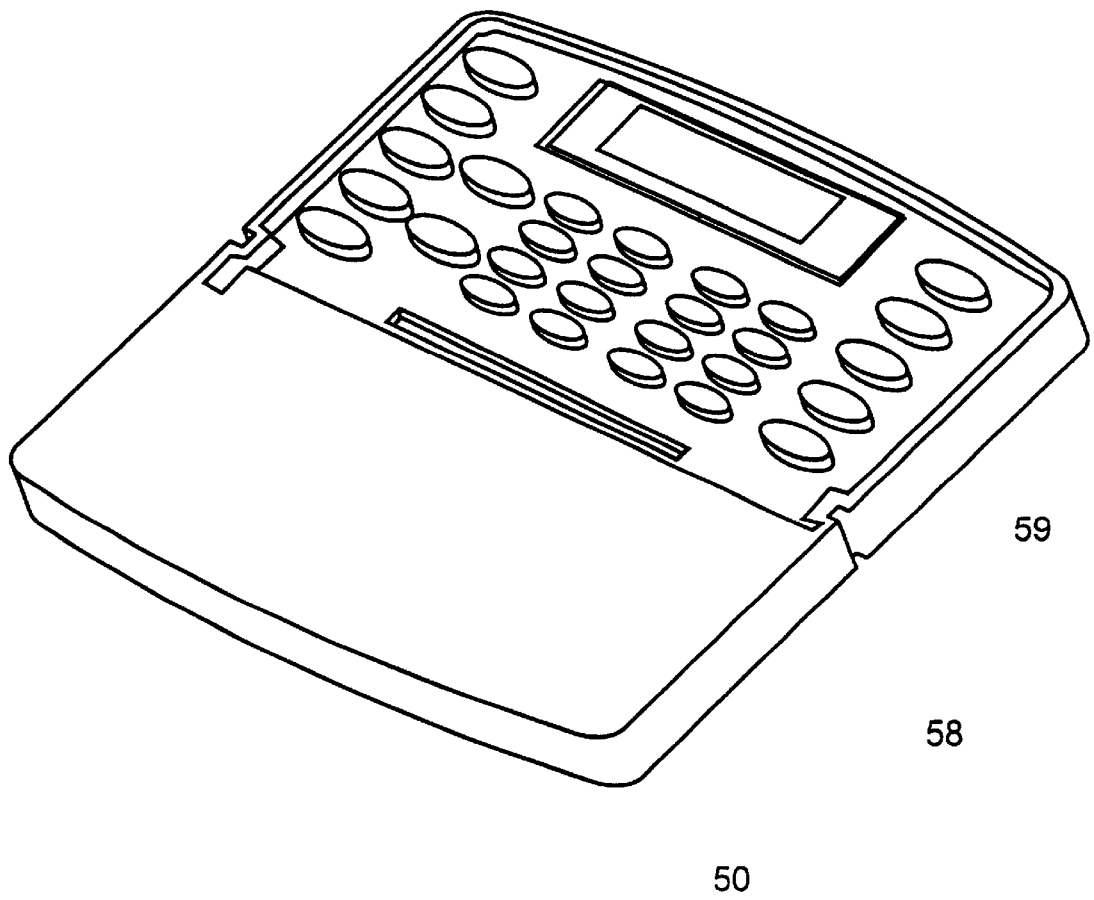
Figure 2E:
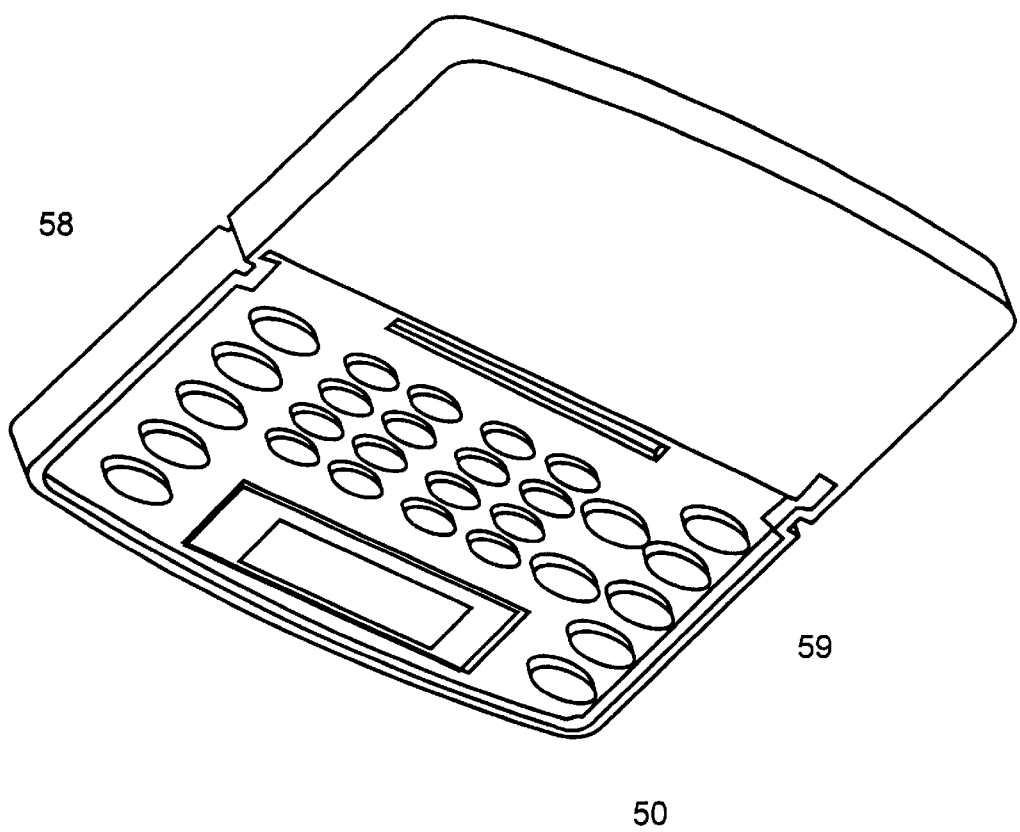

FIGS. 2d and 2e show other embodiments of the Information Storage Device 50 which may include a durable outer case 58 to protect the device from damage, and a hinge 59 which permits the outer case to be folded shut to further protect the LCD, the keypad and the check writing surface from damage. When the outer case is folded shut, the components of the Information Storage Device are protected, and the Device is more compact, making it easier to carry. The device 50 in accordance with the invention however is not limited to the fit embodiments shown. For example, different or additional keys may be added or a different outer case may be used. Now, the hardware components of the device 50 will be described.

Figure 3:
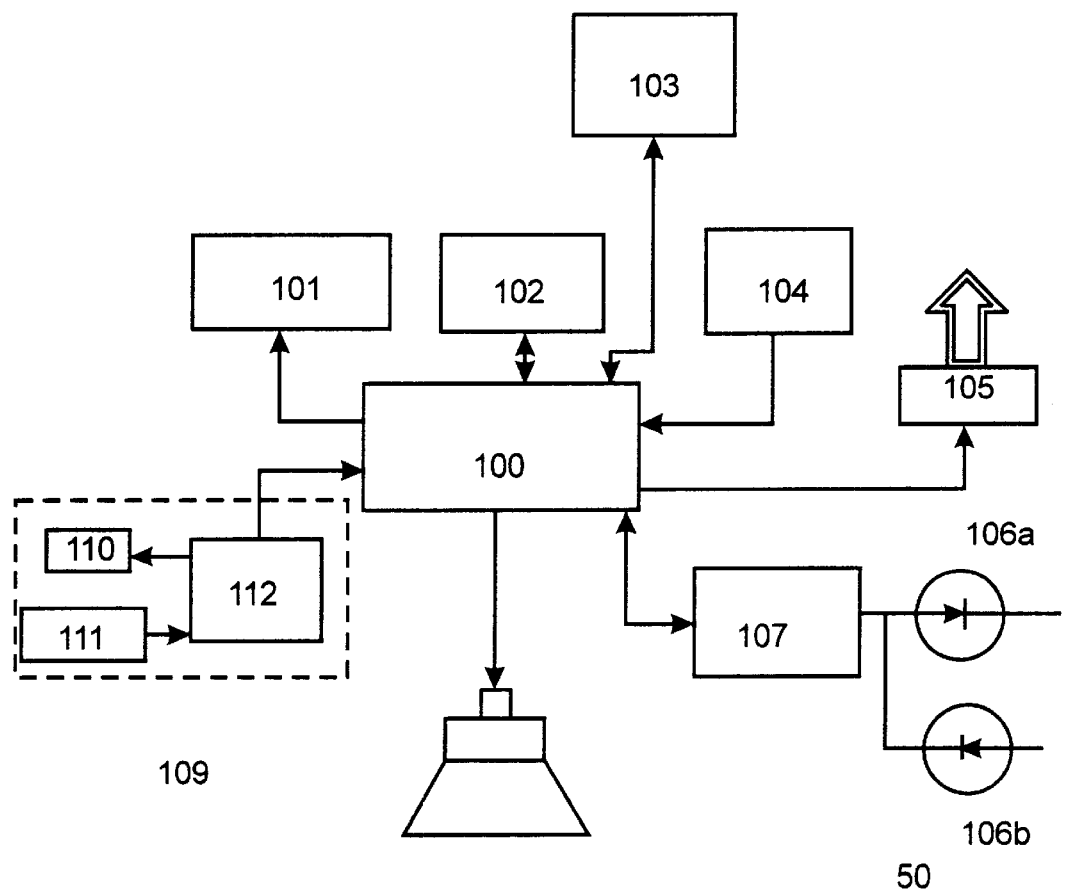
FIG. 3 is a block diagram illustrating the hardware circuitry that may be in an Information Storage Device in accordance with the invention.

FIG. 3 shows the hardware components of the Information Storage Device 50 in accordance with the invention. The Information Storage Device may comprise a microprocessor and associated firmware 100. The various circuitry in the device 50 may be powered by a power supply 105 that may be a battery. The microprocessor and firmware 100 receives a user's input from a keypad 104, and outputs alphanumeric data to an output device 101, such as a liquid crystal display (LCD) panel. The microprocessor and firmware 100 may interface with an RF unit 109 which captures handwritten data and stores an image. The RF unit 109 may include a pen 110, a pad antenna 111 and an RF pad electronics 112 which are described below. The image of the handwriting may be a bit map which may be initially stored in an image random access memory (RAM) 102 and then transferred to a memory 103 where it may be combined with other transaction data to form a transaction record.

The Information Storage Device 50 may further comprise a communications system 120 for communicating financial transaction data to a remote terminal unit. In the example shown, the communications system may include an infrared (IR) transceiver 107, an LED 106b for receiving information from a terminal unit (not shown) and an LED 106a for transmitting information to the terminal unit. To communicate with the terminal units, the transaction records may be converted into a signal which causes the IR transceiver 107 to instruct the LED 106a generate light pulses that are then received by the terminal units, as described below. Similarly, light pulses may be received by LED 106b from a terminal unit, decoded by the transceiver 107 and stored in the memory 103 for use by the device 50. To generate an image of handwritten data, the pen 110 may emit an RF signal which is received by the pad antenna 111, and the RF pad electronics 112 generates an image of the path traced by the pen as described below with reference to FIGS. 4 and 5.

Additionally, Information Storage Device 50 may include an alarm 108, which, using an applications program stored in memory 103, may be programmed to alert the user of scheduled events, like meetings or phone calls. This function is useful when an application program running on the Information Storage Device has a calendar. Now, the RF pad and its electronics will be described.

Figure 4:
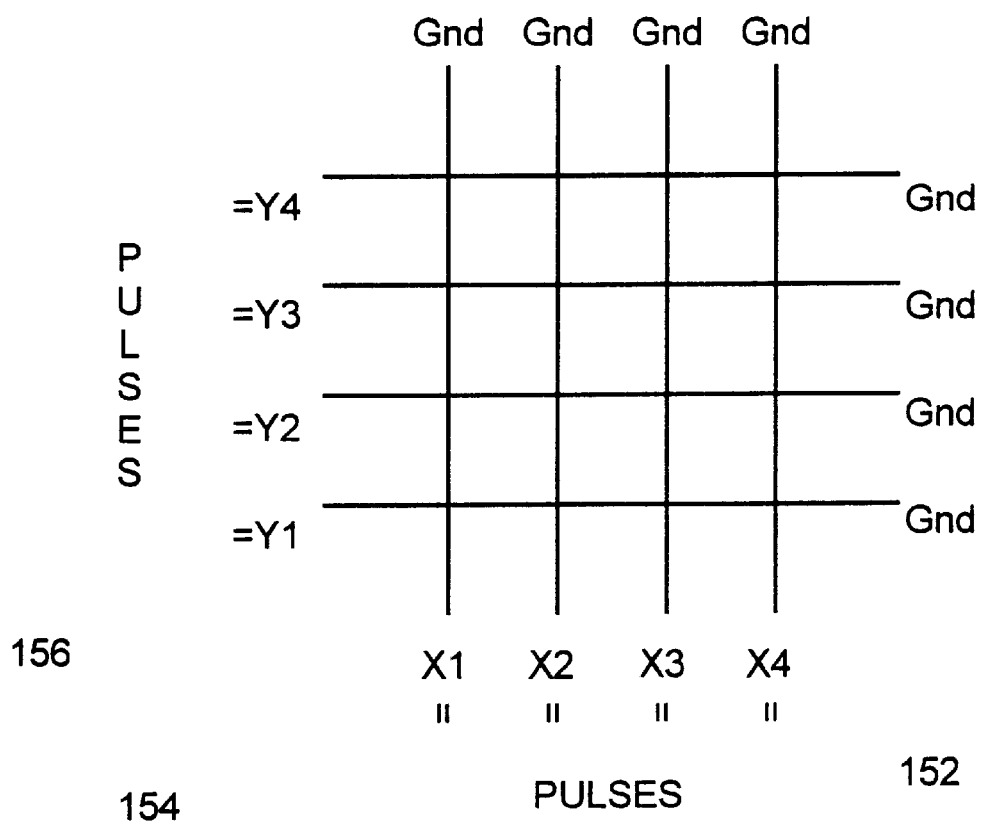
FIG. 4 is a top view of a grid used for the RF sensing pad to capture handwritten data in accordance with the invention.
Figure 5:
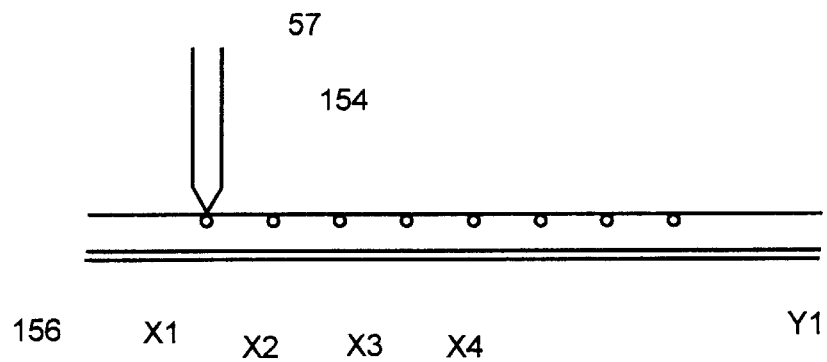
FIG. 5 is a side view showing the interaction between the RF sensing pad of FIG. 4, and a pen.

FIGS. 4 and 5 show the RF pad antenna 111 and the pen 110 used to capture an image of information written on the Information Storage Device writing surface 55 as shown in FIG. 2A. The RF pad electronics 112 may be generally located beneath the "PAY TO THE ORDER OF" field of a check resting on the writing surface 55 so that handwritten information about the payee of the check may be captured in accordance with the invention. The RF pad which has the pad antenna 111 and the RF pad electronics 112 may comprise a printed circuit board (PCB)152 having a set of parallel wires 154 fixed in one orientation and a set of parallel wires 156 which are perpendicular to the first set of wires 154 to form a criss-crossing grid of wires. As shown in FIG. 4, each wire may be terminated at one end so that a voltage differential can be obtained fD between the ends of the wire. The Information Storage Device may generate a unique train of digital pulses for each wire which may preferably be between 20 kHz and 100 kHz. As the pen is placed near the grid of wires on the PCB 152, a unique radio-frequency (RF) signal may be generated in wires near the pen. An example of an RF signal is shown by a dotted line 155 in FIGS. 4 and 5. Each unique RF signal is thus associated with one location on the RF pad, 13 which in turn may be associated with a bit. An accumulation of such bits, as the pen is moved across the writing surface, can be grouped to form an image of the information written across the Information Storage Device writing surface.

The RF pad ensures that when the pen is more than a specified distance above the pad, an image is not recorded. In some embodiments of the invention, when the pen is approximately ¾ inch above the RF pad, 0FFFFh is stored in the bit map which signifies that the pen did not traverse this portion of the writing surface. As described below, to save memory space, a scaled portion of the actual bit map is stored in memory by using methods known in the art. Thus, when only a small area of the writing surface is written on only a small number of coordinates are needed to reproduce this data. Now, the operation of the pen 110 and the antenna 111 will be described.

To capture an image of the movement of the pen (i.e., handwriting), well known electronics in the pen 110 generates an electric field in the pen tip. The electric field in turn increases the amplitude of the RF signal in a wire at the location the pen is above. The RF pad electronics 112 receive and amplify this increased RF signal, rectify it to a DC level, and send it to an analog-to-digital converter. The distance between the pulse signal for each loop and the pen is recorded as an amplitude value. These values may be recorded thousands of times per second as the pen 110 traverses a portion of the Information Storage Device writing surface 55. These values comprise the handwritten information that may later be bit-mapped using the Image RAM 102 (see FIG. 3) and digitally stored in memory 103 of the Information Storage Device. The wireless communications system portion of the device will now be described.

Figure 6:
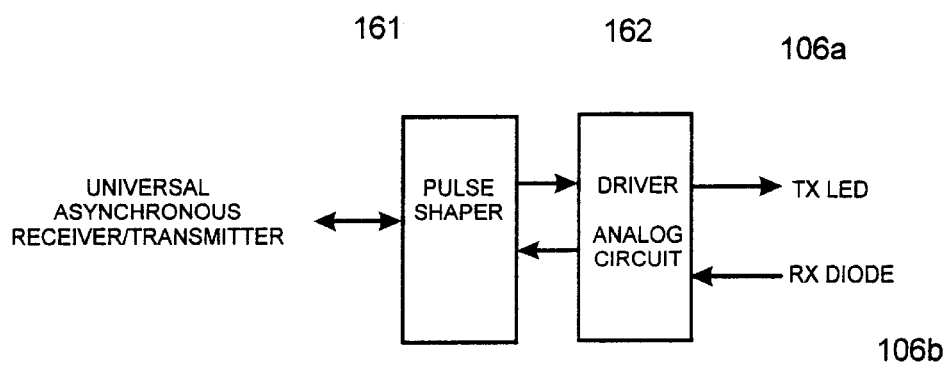
FIG. 6 is a block diagram for the InfraRed (IR) transceiver used for communication with remote terminal units.

FIG. 6 is a block diagram of an embodiment of the communication system 120 that may include the IR transceiver 107. As described Above, the communications system 120 may also include a transmitting light-emitting diode (LED) 106a for sending information in the form of light pulses to a terminal unit such as a host PC, a Receiving LED I 06b for receiving information in the form of light pulses from a terminal unit such as a host PC, a Driver circuit 162 for amplifying light pulses sent to Transmitting LED 106a or for receiving light pulses from Receiving LED 106b, and a pulse shaper 161, for converting a train of data pulses from the device into an NRZ (Nonreturn to Zero) data stream which may be fed into the driver 162 for driving the LED 106a. The pulse shaper 161 may send data received from the driver 162 from the receive LED 106b to the Information Storage Device using a Universal Asynchronous Receiver/Transmitter (UART) (not shown). The pulse shaper 161 may also receive data from the device through the UART to send signals to the driver 162 for outputting data using the transmit LED 106a. In some embodiments, the Transmit LED 106a and Receive LED 106b may operate at 9600 baud.

In order to conserve power, before the UART receives a signal, the pulse shaper 161 may convert pulses received by the Receive LED 106b to 1.6 $\mu$s pulses. Likewise, after the UART transmits a signal to the pulse shaper 161, the Pulse Shaper converts the 1.6 μs pulses into an NRZ data stream. These shorter pulse width signals use less power than conventional pulse shapers. At the terminal unit, because little power is needed to receive pulses generated by the Transmit LED 106a, the terminal unit needs no additional power source to receive the pulses. Instead, the communications system in the terminal unit may use the power generated by the pulses themselves to receive the pulses. Accordingly the terminal unit is less expensive because it does not require a communications power source. Now, the overall operation of the device will be described.

Figure 7A:
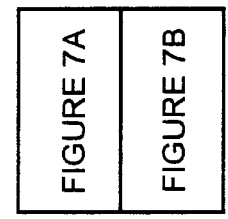
FIGS. 7a–b are flowcharts illustrating a method for entering a transaction into an Information Storage Device and for transferring the transactions to a personal computer in accordance with the invention.
Figure 7A:
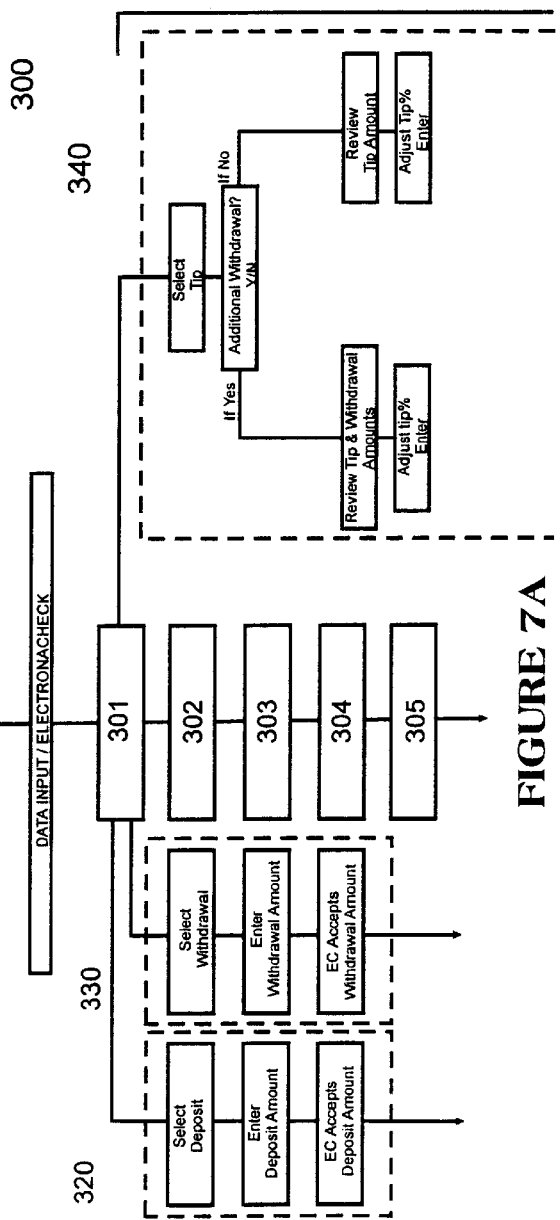
Figure 7B:
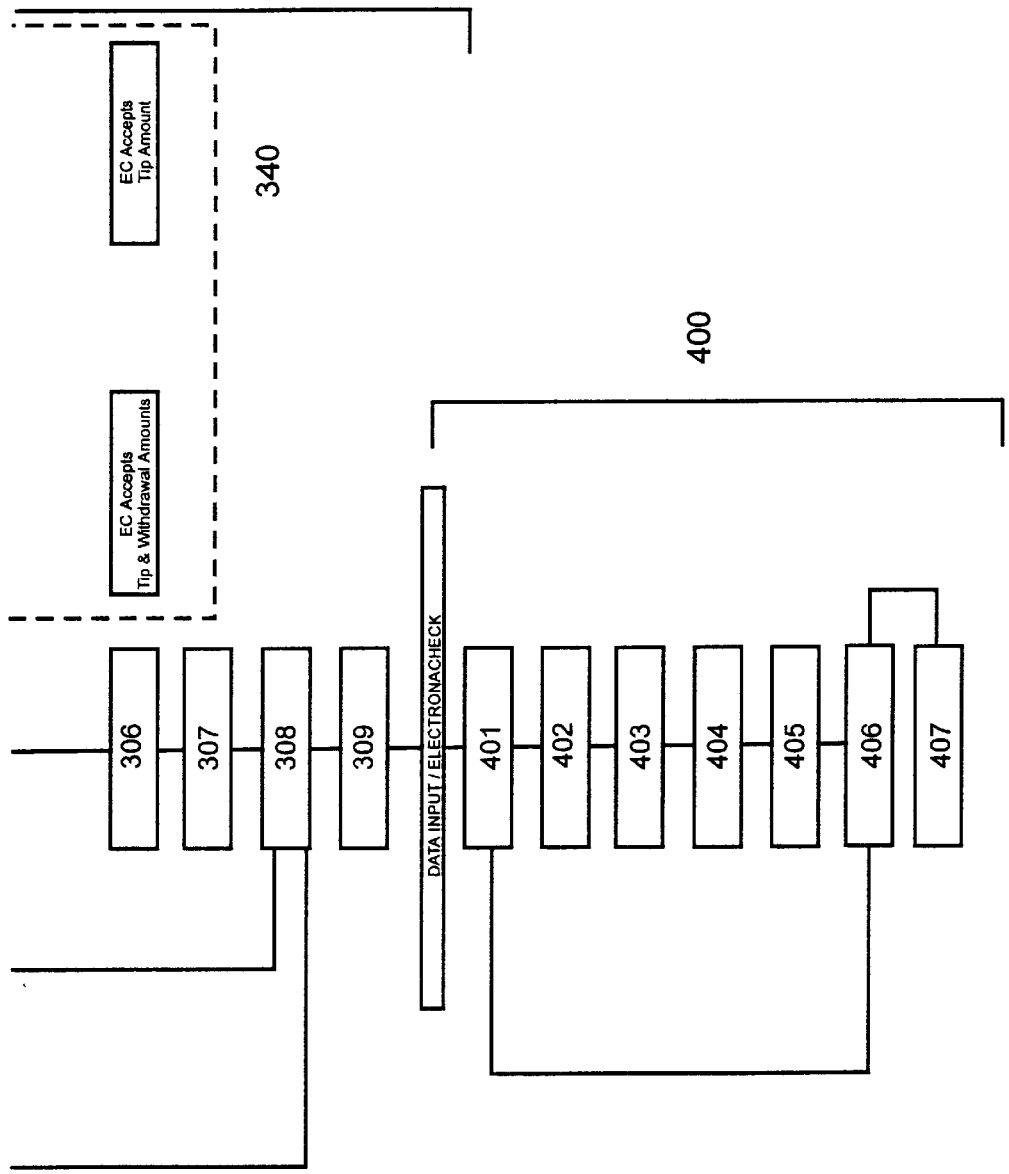

FIGS. 7a and 7b are a system flowchart of a method for using an Information Storage Device in connection with a PC in accordance with the invention. Generally, the method may include an initialization on the PC host process 200 (such as steps 201–205), a data input into the information storage device process 300 (e.g., for a checking transaction, steps 301–309), and a synchronization between the information storage device and the PC host process 400 (steps 401–407). During the initialization process 200, the software application which communicates with the device being executed by the host PC may be initialized. During the data input process 300, a user may use the device to perform various financial transactions, such as deposits, withdrawals, check writing, and tip determination. During the synchronize process 400, the transaction records in the device may be communicated to the host PC and the data may also be communicated from the host PC to the device. Each process will now be described in more detail.

During the initialization process 200 on the PC Host, the PC is initialized to set up accounts for individuals and to set up security to allow only certain persons to access these accounts. First, the user must turn on the PC and enter a password to enter the software application of the PC which communicates data with the device in step 201. The user may then enter the names of the users who can access certain accounts in step 202 since the PC software application may support different users, each having a separate account stored on the PC. In step 203, the user then selects the account features that the user wishes to have on the PC. For example, a person may use the PC only for personal use or may want the tip calculation function to be activated. For personal use, the user may therefore wish to have the computer store only a personal identification number (PIN), money spent on tips, and an account balance. If the user was an accountant for a corporation, the user may wish to store other information using the account features selection process. Next in step 204, the accounting software on the PC, such as Quicken or Excel, will correlate the users with the accounts that the user has access to. Finally, in step 205, the user can set up specific categorization schemes that he may desire the software to track, such as a tax/non-tax categorization or a budget categorization so that the accounting software can generate charts or spreadsheets for those categories so that the user can better track his financial transactions.

Now the data input process 300 will be described. As an example, a process for inputting data into the Information Storage Device during a check transaction will be described. Other transactions are readily seen from FIGS. 7a and 7b and are generally discussed below.

For any input process, the user will first turn ON the Information Storage Device and enter a PIN in step 301. In some embodiments, turning ON the Information Storage Device automatically allows access to a financial software applications program, such as Quicken. Thus, the user can use the software package without having to scroll through menus or enter information on a keypad.

Now, the steps for inputting data during a checking transaction will be described. The user may select a checking transaction process in step 302 and may confirm in step 303 that the next check number to be entered, based on the device's counter, is correct. For example, the user may have voided a check so the device's counter may not be correct. The user may then correct the check number if needed. Next, the Information Storage Device will prompt the user to input a check amount in step 304, and the user will enter the amount of the check using the keypad in step 305. Next, the user will write the check in step 306 so the image of the payee's name may be captured and select a category, if any, of the check such as FOOD, BUSINESS, etc. in step 307. The Information Storage Device may then store this image information and other data into a transaction record and update the balance shown on the display of the Information Storage Device in step 308. Applications programs running on the Information Storage Device may then process the data or image stored in the transaction record. The check entering process may then terminate in step 309.

Instead of writing a check, the Information Storage Device may also be used during other financial transactions, such as for depositing money into an account as in block 320, for withdrawing money from an account as in block 330, or for calculating a tip as in block 340.

These various transactions are discussed briefly below. The Information Storage Device may also be used for other financial transactions, such as ATM or POS transactions, and the invention is not limited to the financial transaction processes shown in FIGS. 7a and 7b. The Information Storage Device may also be used to complete home banking transactions through a variety of different electronic communications paths since the Information Storage Device may perform home banking transactions using an ATM terminal, a POS terminal or an electronic kiosk. For any of these different financial transactions, the user may enter information into the Information Storage Device and then wirelessly transmit the information to a financial institution through a merchant's terminal, which may be an ATM terminal, a POS terminal or an electronic kiosk.

The financial institution may then execute the financial transaction based on the information transmitted to it and provide the merchant and the Information Storage Device with an electronic receipt of the financial transaction. In this manner, using the Information Storage Device a paperless financial transaction may occur without a ATM or debit or credit card.

If the Information Storage Device is used for depositing money into an account as in block 320, the user may select a deposit transaction in step 321 and enter the deposit amount on the Information Storage Device in step 322. The Information Storage Device then accepts the deposit amount in step 323 and records this transaction into a transaction record in its memory and updates the user's account balance in step 308. The process terminates in step 309.

If the Information Storage Device is used for withdrawing money from an account as in block 330, the user may select a withdrawal transaction in step 331 and enter the withdrawal amount on the Information Storage Device in step 332. The Information Storage Device may then accept the withdrawal amount in step 333, records this transaction in a transaction record in its memory and updates the user's account balance in step 308, and the process ends in step 309.

If the Information Storage Device is used to calculate a tip as in block 340, the user first may select a tip transaction in step 341. The device may determine if the user, in step 342, wants to withdraw additional funds to cover the tip. If the user would like to withdraw money from an account to pay the tip, he may review the tip and withdrawal amounts in step 343 and adjusts the tip in step 344. He may then confirm this amount by entering it into the Information Storage Device which accepts this transaction in step 345, stores it in a transaction record, and updates the user's account balance in step 308. If the user does not want to withdraw money from an account to pay the tip, the user may review the tip amount in step 346 and adjust it in step 347. He can then confirm this amount by entering it into the Information Storage Device in step 348, which stores the information in a transaction record in its memory and updates the user's account balance in step 308. Now, the synchronization of the Information Storage Device with a terminal unit, such as a host PC, will be described.

The Information Storage Device may be synchronized with the Host PC in block 400. The PC may initiate contact with the Information Storage Device in step 401 by a communications link, such as a wireless link using IR pulses. RF pulses, or any other wireless communications link may also be used. The Information Storage Device responds by transmitting a unique identification. The PC then reads the unique identification belonging to the Information Storage Device and verify the identity of the Information Storage Device in step 402. The Information Storage Device then transmits data to the PC and the PC receives the data in step 403. The PC may then update this data in its memory and the Information Storage Device verifies that the transfer is complete in step 404. The PC may verify that it has received the data and commands the Information Storage device to erase this data from its memory in step 405. The PC then queries if there are any more data transfers in step 406. If there is no more data to transfer, the process terminates in step 407. Otherwise, the PC initiates contact again with the Information Storage Device in step 401 and the process continues until the Information Storage Device transmits all its data to the PC. Now, an example of the data structure for communicating data between the device and the terminal unit will be described.

Figure 8:
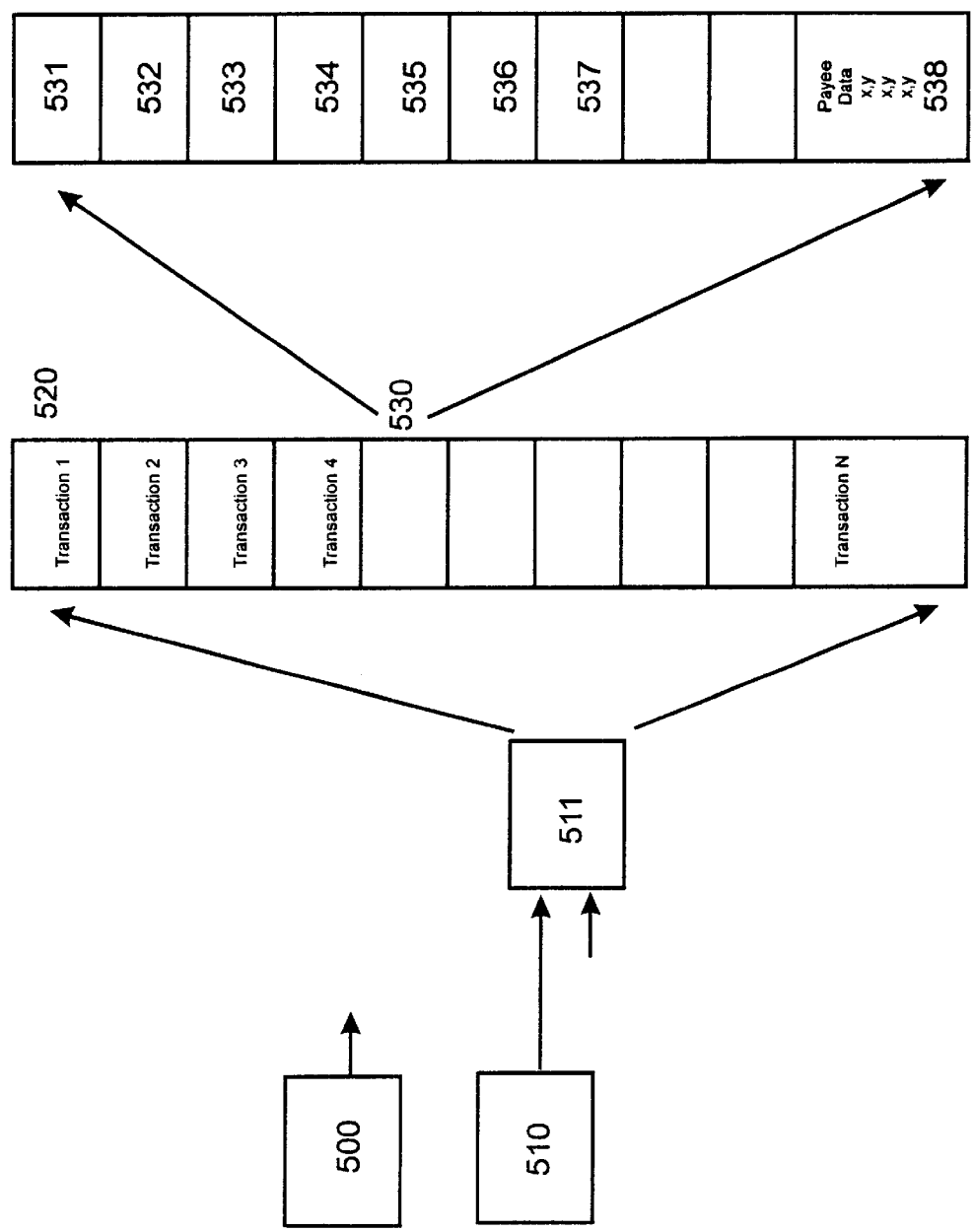
FIG. 8 is a diagram illustrating a data structure for a data packet comprising multiple transactions used to store and transmit transactions to a remote terminal unit in accordance with the invention.

FIG. 8 shows the data structures for both a status packet 500 and a data packet 510 for a block of transactions to be transmitted, for example, from the Information Storage Device to a host PC using wireless transmission. The transactions may also be transferred to the Information Storage Device or any other terminal unit. The status packet 500 is a block of data describing the status of a connection between the Information Storage Device and the PC. It may also, for example, contain information about the amount of memory used in the Information Storage Device. The status packet 500 is transmitted from the Information Storage Device to the PC before each data packet 510 is transferred from the Information Storage Device to the PC.

The data packet 510 may comprise a data portion 511 which contains a plurality of transaction records 520 combined into a data stream. For purposes of illustration, a data record for a check transaction only is described although the other financial transactions may have a similar transaction record. Each transaction record 530 may comprise a number of data fields, including a length field 531 which indicates the length of the complete transaction record including the length field, a check number field 532 indicating the check number for the particular transaction record, an amount field 533 indicating the dollar amount of the transaction, a balance in the account field 534 which indicates the amount in the account after the check is deducted, a category field 535 indicating a category, if any, of the transaction, a date and time field 536 indicating when the check information was entered into the Information Storage Device, an amount of the deposit or withdrawal field 537, if applicable, and a scaled bit-mapped representation of the handwritten name of the payee 538.

Each data packet 510 may be given a file extension "ECD" which allows the data packet to be easily identified when downloaded to a system and scanned, for example, during a system debug. FIG. 8 further shows the steps in the process of transmitting a data packet in which the status packet 500 is transmitted to the Host PC. The data packet 510 is opened once it is transferred to the Host PC and the data packet 510 is double buffered to produce a second, identical data packet 511 which may be used for Windows and other applications programs. Now, the operation of a terminal unit during communications with the device will be described.

Figure 9:
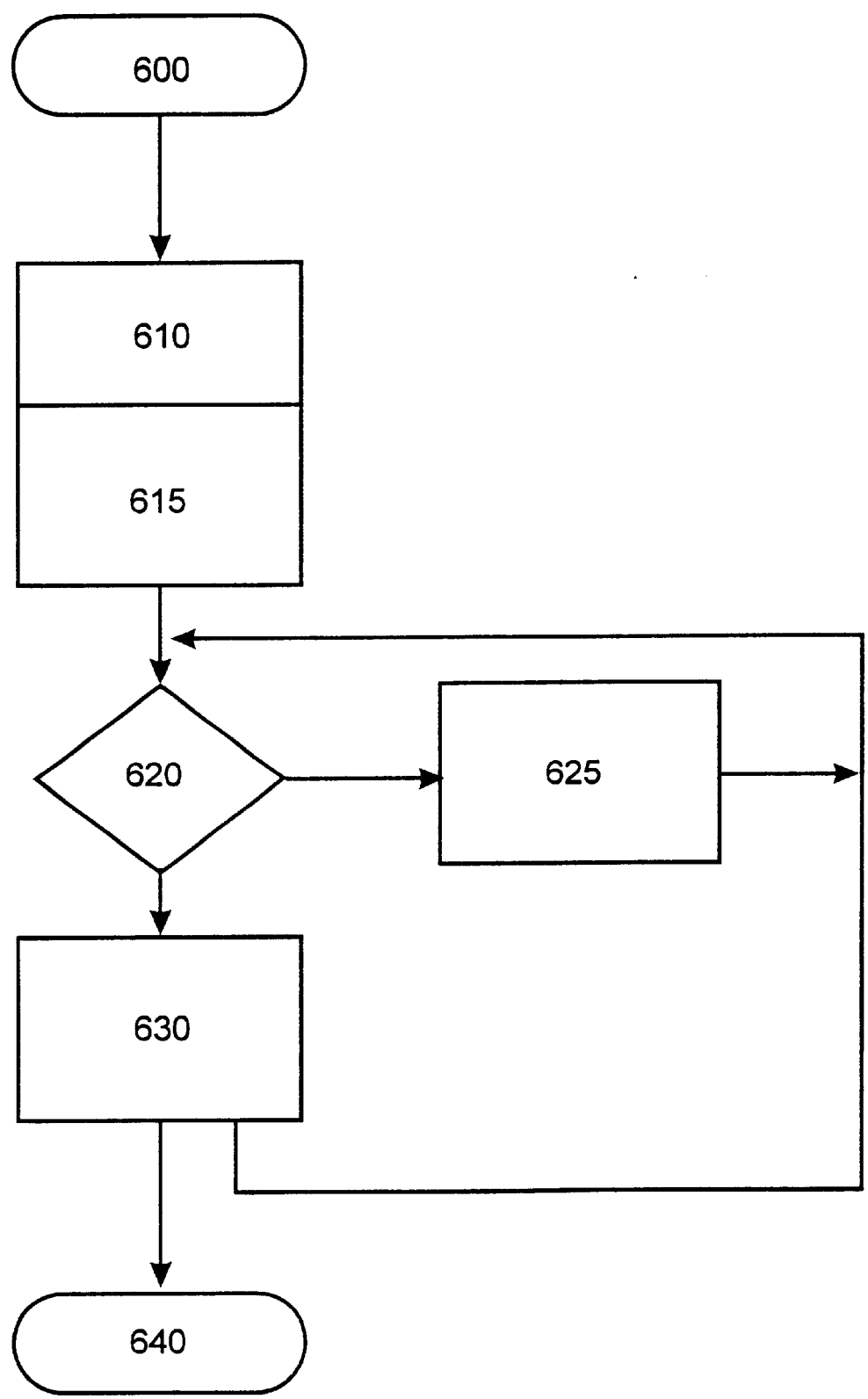
FIG. 9 is a flowchart illustrating a method for inputting transactions into an applications program running in a Windows environment.

FIG. 9 is a flowchart of a method 600 that may be executed, for example in a Windows environment, on a remote terminal, such as a Host PC, for communicating with the Information Storage Device. The method initializes and creates Windows menus data files, and performs other housekeeping chores in step 610. Next, the program initializes hardware and software ports and the IR wireless communications adapter (IrDA) in step 615. Next, the program polls the IR adapter to see if the Information Storage Device has any data to transfer in step 620. If there are no messages to transfer, other tasks such as background processes, which may be other applications programs running on the PC, may be performed. While running these background processes, the PC continually checks to see if messages from the Information Storage Device are waiting in step 620. If there is a message waiting from the Information Storage Device, the program will translate the message to a format it understands, send the message to the applications program it is intended for, and runs the applications program. It then enters the Windows Message Loop (discussed below), and checks whether another message is waiting to be sent to it in step 620. If no more messages are waiting to be sent to it, the program exits the Main Loop in step 640. Now, a background process will be described.

Figure 10:
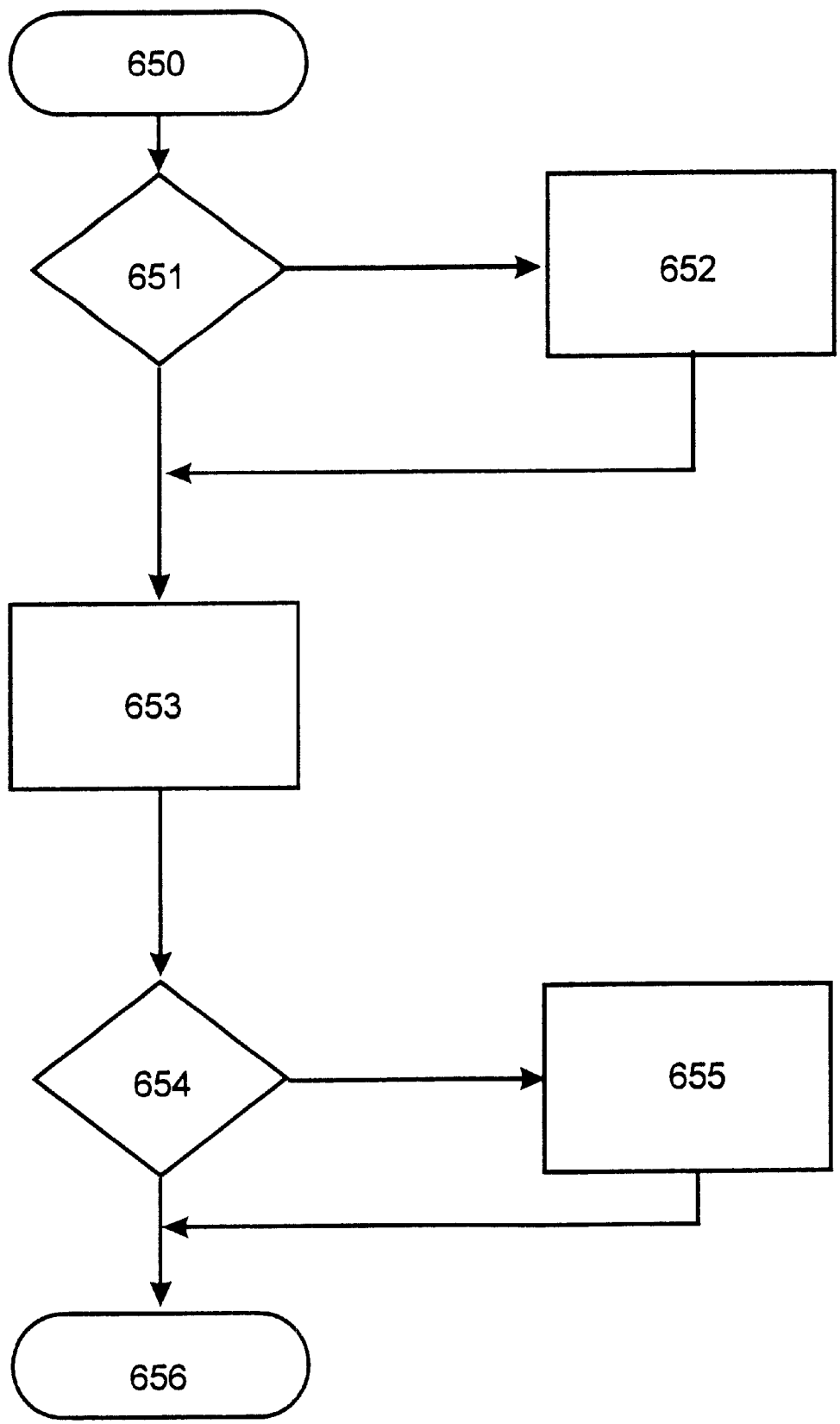
FIG. 10 is a flowchart illustrating a method for storing characters received from the keypad and writing surface on the Information Storage Device.

FIG. 10 is a flow chart of the operation 650 of a terminal unit such as a host PC executing a background process when no messages are received from the Information Storage Device and Background characters are processed. After starting the Background Character routine, the system determines if there are any characters from the Information Storage Device stored in the Receive Buffer in step 651. If there are characters in the Receive Buffer, the characters are copied into a frame buffer that stores the characters, and the count reflecting the number of characters stored is updated in step 652. If there are no characters or the characters are stored, the process goes to step 653 in which a Character State Machine (as described below) is run. This is usually executed using the IrDA protocol, which includes a lower level Link Access Protocol (LAP), and a higher level protocol that looks for errors in the communications link. The Character State Machine (CSM) tries to read data into the Receive Packet buffer. The Background Character routine next determines whether a complete packet has been sent in step 654. If a complete packet has been sent, the packet is sent to an applications program in step 655 and the method ends at step 656. The routine also ends if no complete packet has been sent. Now, the Windows Message Loop routine will be described.

Figure 11:
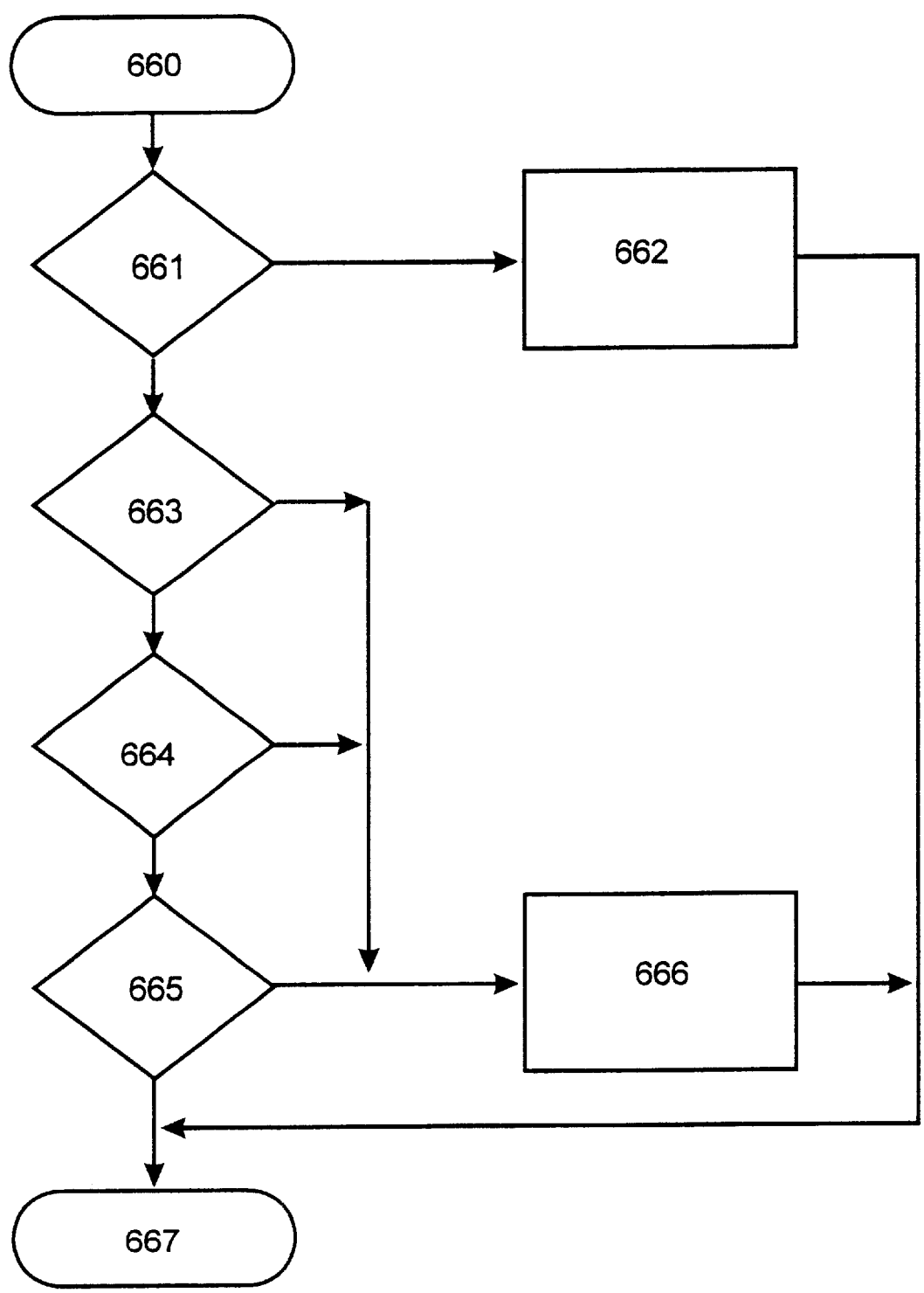
FIG. 11 is a flowchart illustrating a method for receiving data in a Windows Message Loop.

FIG. 11 is a flowchart for a Windows Message Loop (WML) as discussed in step 630 of FIG. 9. After starting, in step 660 the WML determines if a message is waiting and runs the background process if no message is waiting. If a message is waiting, the WML then determines whether the message is intended for a process running under Windows in step 661. If the message is for a Windows application, the WML determines if a quit message is received in step 661a and exits at step 640 if a quit message is received. If a quit message is not received, WML calls the appropriate Windows functions to process the message in step 662 and returns to the background process. If the message is not intended for a process running on Windows, the program determines if the message is a timer message and sets a timer in step 663. A person may then break the communications link between the Information Storage Device and the terminal unit, thus interrupting communication between the two and rather than wait forever for the link to be reestablished. The timer may run the Packet State Machine in step 666 after a predetermined length of time and allow the program to perform other tasks.

If the message is not a timer signal, the process determines whether the message received is a Receive Packet in step 664. If a receive packet is received, the WML executes the Run Packet State Machine 666 (discussed below) and runs the background process. If the message is not a Receive Packet for processing, the WML process checks to see if the message is a request for connection from the communications link in step 665 and, if a request of connection message is received, the WML executes the Run Packet State Machine in step 666. As shown, if the message is a timer message, a received packet or a connect request, the Packet State Machine is executed. Otherwise, the WML runs the background process and waits for a message in step 660. Now, the packet state machine will be described.

Figure 12:
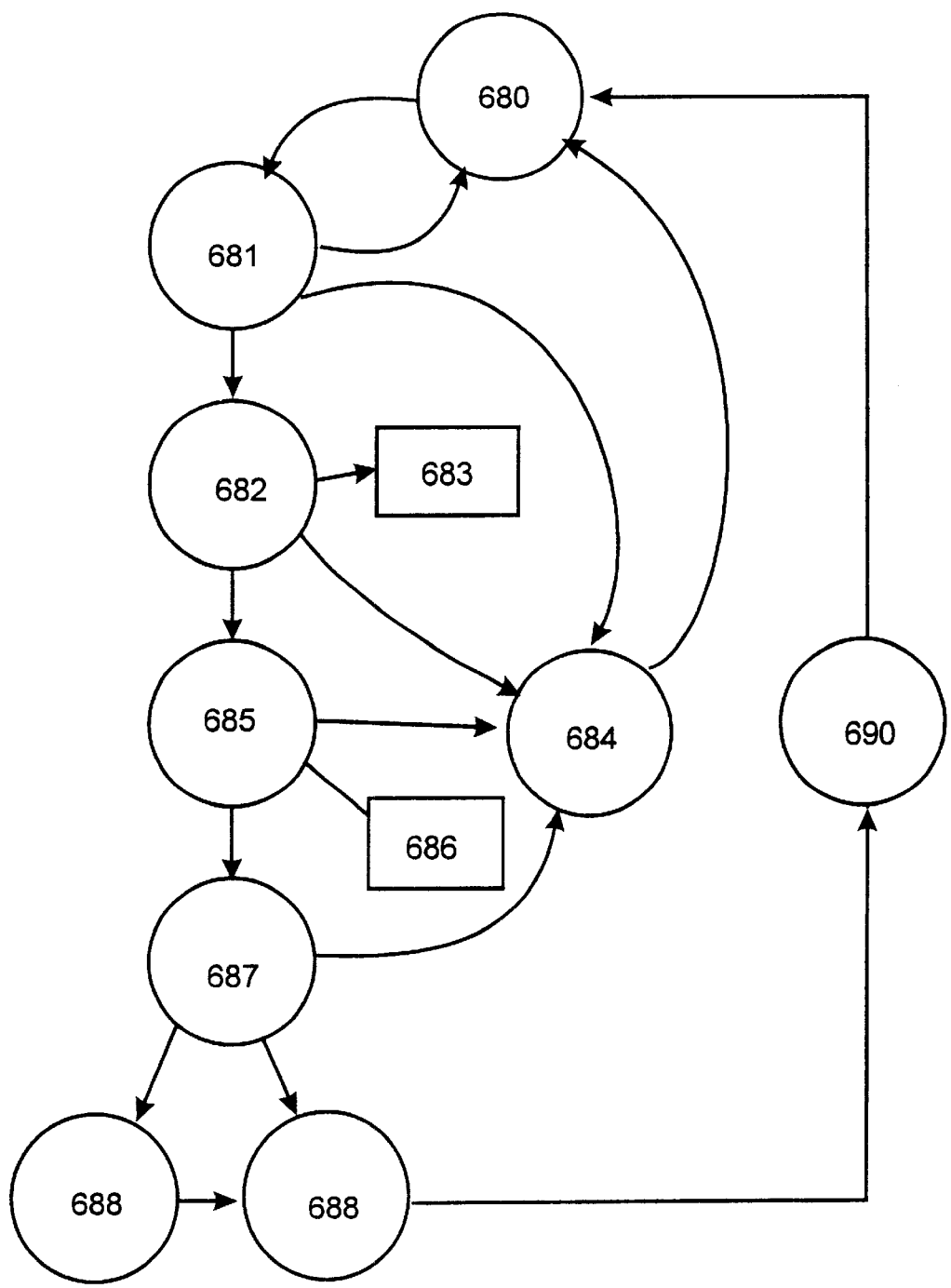
FIG. 12 is a diagram illustrating a state machine for receiving data packets in accordance with the invention.

FIG. 12 illustrates the Packet State Machine (PSM), as shown in step 666 in FIG. 11. The PSM processes packets of data received by the PC. The PSM is initially in an Idle State 680, waiting for a command. If there is a request to connect to the Windows Menu, the PSM goes into a Query State 681 to poll whether a message has been sent. Once in Query State 681, the system may either time out and return to Idle State 680 if no messages have been sent to the program, or the Query may fail and the PSM may go to a Fail state 684. Otherwise, if a message has been sent, the message will be assigned a Unit ID 683 in an Assign state 682 that identifies which Information Storage Device it was sent from. If the Unit ID is not valid, the PSM will go the Fail State 684.

After the message has been assigned a valid Unit ID, its status is checked in a status state 685. The status check will include checking the Status Data Packet discussed above in relation to FIG. 8. The status information may also be saved at 686. The PSM continues to receive data in a data state 687 until there is no more data to be received. Once the last data is received, the PC commands the Information Storage Device to clear its memory in a clear state 688 and to break the communications link between the two in a Kill Link state 689. Alternatively, if the data is corrupted, the PSM will again break the link between it and the Information Storage Device in state 689. The PSM now enters a Done state 690, and the PSM waits for the next packet in the idle state 680. Now a character state machine will be described.

Figure 13:
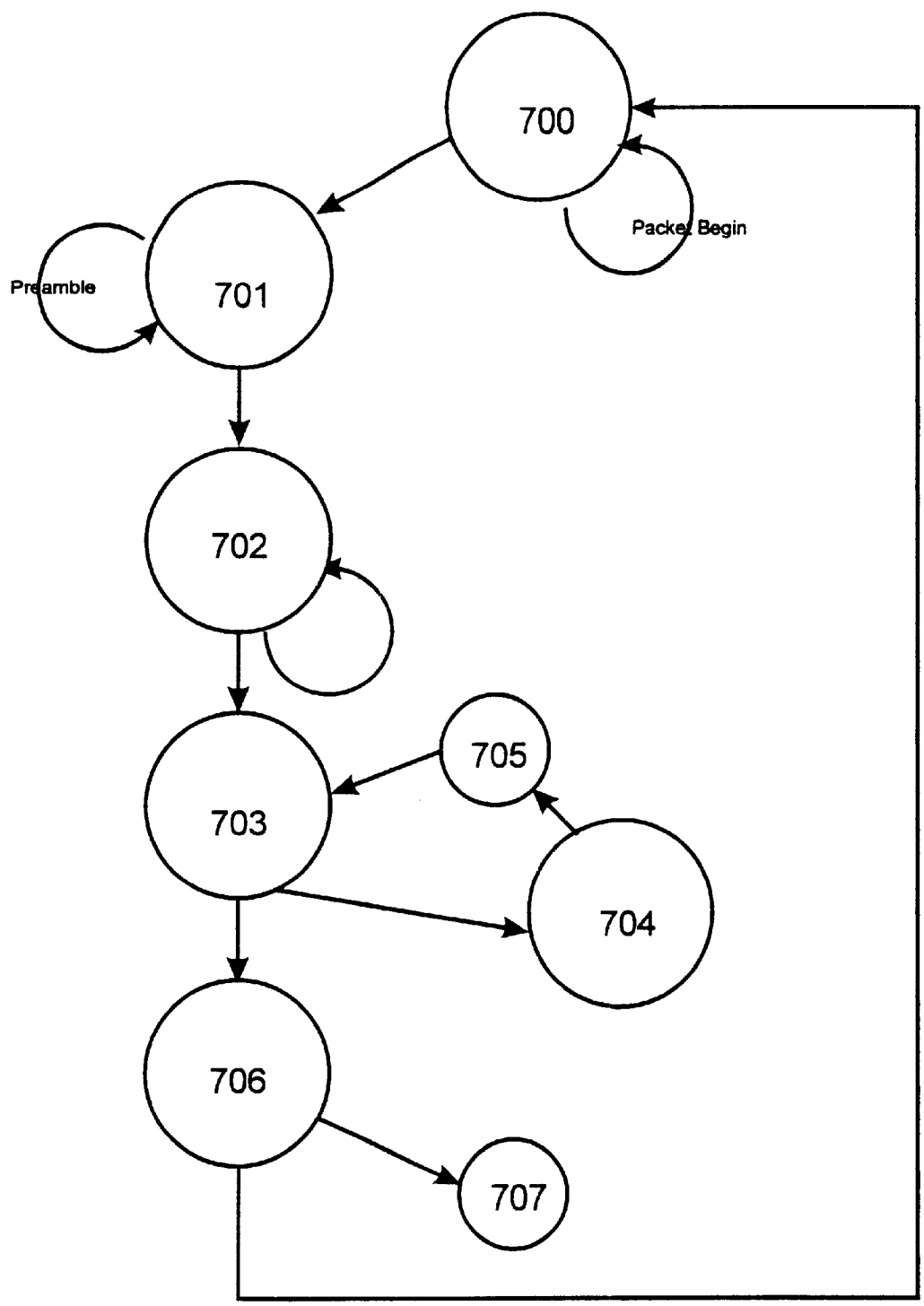
FIG. 13 is a diagram of a state machine for receiving characters in accordance with the invention.

FIG. 13 is a Character State Machine (CSM) 699 used to process the individual characters of a message. The CSM remains in an Idle state 700 until the data packet is received. When a data packet is received, the CSM enters the Prewait state 701. The CSM then reads preamble information in the data packet in a preamble state 702, which is used for synchronizing the communications between the Information Storage Device and the terminal unit. It also reads information, such as the Unit ID, for the Information Storage Device. The CSM continues reading characters into a buffer until there are no more characters to be read.

The Character State Machine next stores the ID of the Information Storage Device it is communicating with and stores the associated data in the same buffer in a data state 703. If the program does not recognize the Unit ID, the Character State Machine will enter the Escape state 704, storing the number of packets that it had received and again tries to read the ID of the Information Storage Device that it is communicating with. If the Character State Machine reads a correct Unit ID, it checks the CRC data field to ensure that the data was sent without error in state 706. If the data does have an error, an Error state 707 is entered. Otherwise, the Character State Machine posts the data in a post state 708 and returns to the Idle state 700.

The PC may communicate with a plurality of different Information Storage Devices. For example, many users may store data and user application programs on the PC. They may each have their own passwords and data areas. The wireless communication of data between the device and the terminal units will now be described.

To wirelessly communicate with a PC, ATM, terminal unit, or Internet-connected device, a user may lay his Information Storage Device on a table, lining up the IR LED with the PC's IR window. The PC initiates communications with the Information Storage Device, correlating the Unit ID with user data programs. If the PC recognizes the Unit ID, it allows the user to transmit data into his area and run application programs. When the transfer is complete, the user may remove his Information Storage Device from the table. Then, a second user may line up his Information Storage Device with the PC's IR window to transmit data to the PC using the same process.

In order to exchange information with the Information Storage Device, the terminal unit must run certain application programs. These application programs may be used to store and transmit information to the Information Storage Device when, for example, the Information Storage Device is initialized. For example, if the Information Storage Device is used to write checks, the PC must initialize the Information Storage Device with a starting check number, starting balance, and a list of the categories needed. In addition, the PC may store a phone list, an appointment calendar, or application programs to be stored in the memory of the Information Storage Device to be executed. The PC may also transmit to the Information Storage Device programs that allow the Information Storage Device to communicate with the terminal unit. In addition, application programs transmitted from the PC and stored in the memory of the Information Storage Device may also contain programs and data for a single checkbook display to be run on Quicken or Excel on the Information Storage Device or the terminal unit. Now, the displayed information during the operation of the device will be described.

Figure 14:
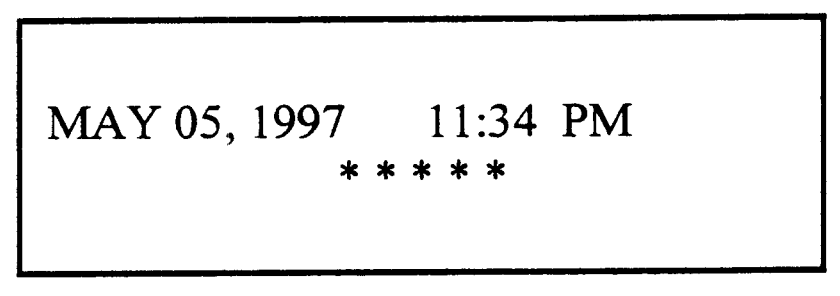

The following discussion relating to FIGS. 14–22 uses reference numerals for keys discussed in relation to FIGS. 2a–2c. FIG. 14 shows the information displayed on the LCD 96 of the device when the Information Storage Device is turned ON. The date and time are displayed. In this stage, the Information Storage Device can be used as a calendar or a clock.

FIGS. 15a–15c show the prompts displayed on LCD 96 when the user enters checking information in accordance with the invention. In FIG. 15a, the user may open the Information Storage Device and press the <Check> key 61. The date (May 5, 1997), the check number (0505), and the balance ($1,535.97) appear on LCD 96. The user then enters the amount of the check ($125.75) on numeric keypad 90 as shown in FIG. 15b. The user can enter another amount if the amount entered was incorrect by pressing <CE /ON> key 91. Otherwise he can press <Enter> key 92 to enter this amount into the Information Storage Device. LCD 96 now displays the information shown in FIG. 15b, including the new balance ($1,410.22).

By pressing the <Enter> key 92, the RF pad electronics is turned on to capture an image of the payee name information. The user fills out the fields on the check with his pen (e.g., date, amount, payee, signature, and memo), and removes the check from the checkbook. The information written in the "PAY TO THE ORDER OF" field of the check has now been stored in the memory of the device. The user can now use the <+↑> key 83 or the <−↓> key 84 to scroll through a list of categories that the check belongs to, and press the <Enter> key 92 to store this category in a transaction field in the memory of the device. LCD 96 now displays the information, shown in FIG. 15c including the date, check number, balance, and category of the transaction (FOOD).

FIGS. 16a–c show LCD information that may be displayed when a user uses the Information Storage Device to make a deposit into an account. The user may first press the <Deposit> key 63. LCD 96 can then display the items shown in FIG. 16a including the date, balance, and deposit number (011). The user then enters a deposit amount (e.g., $125.75) using the numeric keypad. He presses the <Enter> key 92 to confirm the amount of the deposit. The LCD 96 may now display the information shown in FIG. 16b, including the amount of the deposit ($125.75) and the new balance ($1535.97). Again, using the <+↑> key 83 or the <−↓> key 84, the user can scroll through a list of categories to show that the deposit was made for "MY PAY." By pressing the <Enter> key 92, the user stores this information in a transaction record in the memory of the device. The LCD 96 now displays the information shown in FIG. 16c.

FIGS. 17a–b show the LCD information that may be displayed when a user uses the Information Storage Device to make an ATM withdrawal. The user may first press the <ATM> key 65. The LCD 96 can then display the items shown in FIG. 17a including the date, balance, the type of transaction (ATM W/D), and blank areas for the amount to be filled in. The user then enters a PIN (e.g., 2222). If this PIN is correct, the user presses the <Enter> key 92 to store this data in the Information Storage Device. Next, using the numeric keypad, the user enters the amount of the withdrawal, ($120.00). He presses <Enter> key 92 to confirm the amount of the withdrawal and to transmit this data from the Information Storage Device to the ATM and to receive account information from the ATM. LCD 96 can now display the information shown in FIG. 17b, including the amount of the withdrawal ($120.00) and the new balance ($1415.97). This information may now be stored in a transaction record in the memory of the device.

FIGS. 18a–c show the LCD information that may be displayed when the user transfers information such as transaction records stored in the memory of the device to a terminal unit, such as a Host PC. The user may first press the <IR> key 93. The LCD will display the information shown in FIG. 18a including the date, an indication that the device is in the IrDA Mode, and a message that the device is waiting for the PC to respond and initiate the handshaking protocol. Next, as shown in FIG. 18b, the LCD shows that data is being transferred. Finally, as shown in FIG. 18c, the LCD shows that the transfer is DONE.

FIGS. 19a–c show the LCD information that may be displayed when the device is used to calculate tips at, for example, a restaurant. First the user presses the <Tip> key 67. The LCD displays the information in FIG. 19a such as the date, the function (Tip), a default tip of 15%, and blank fields for the amount of the bill and the total, including the tip. Next the user enters the amount of the bill ($121.50) using the numeric keypad. The user presses the <Enter> key 92 to confirm this amount, and LCD 96 displays the information shown in FIG. 19b such as the date, the bill ($121.50), the tip percentage (15%), the tip ($18.23), and the total amount with the tip ($136.08). The tip percentage can be programmed by the user when the device is initialized to an amount the user normally tips. The user can then press the <+↑> key 83 to increase the tip percentage and display the corresponding tip percentage, tip amount, and total amount; or the user can press the <−↓> key 84 to decrease the tip percentage and again show the corresponding tip percentage, tip amount, and total amount. The new tip (12%) and total amount ($136.08) can now be displayed as shown in FIG. 19c.

FIGS. 20a–c show how the Information Storage Device can be used as a calculator with the corresponding LCD information. First, the user can press <Calculator> key 64 to enter the calculator mode. LCD 96 displays the information shown in FIG. 20a such as the date and a notation that the device is in the calculator mode. The user can then input numeric data and algebraic operators using the keypad (here, 153 * 7.4) and press the <Enter> key 92 to show the result ($1,132.2). The LCD after entering data in this operation is shown in FIG. 20b.

FIGS. 21a–b show how the Information Storage Device can be used to check the balance in an account and the corresponding information displayed on LCD 96. First, the user can press the <Bal> key 66. The LCD 96 can display the information shown in FIG. 21a such as the date and a prompt for the user's PIN. The user will enter his PIN (2222) and press <Enter> key 92 to confirm this amount. The LCD 96 may then display the information shown in FIG. 21b, including the balance in the account, the battery level of the device, and the memory level of the display. For security reasons, the PIN will not be shown.

FIGS. 22a–c show how the device can be used to do a point-of-sale transaction at a merchant's location. First, the user can press the <E Transaction> key 70. The LCD 96 can display the information shown in FIG. 22a including the type of account accessed for the transaction, here, checking. The LCD also displays a prompt for the user to enter a PIN to access this account. The user will enter a PIN (e.g., 2222) and press the <Enter> key 92 to confirm his selection. The LCD may then display the information in FIG. 22b, prompting the user to enter an amount of the transaction. The user will use the numeric keypad 90 to enter an amount and will press the <Enter> key 92 to confirm this amount. The information in FIG. 22c will then be displayed, showing that the transaction has been completed. Using this method, funds may be transferred automatically from the user's account to the merchant's account.

In addition, the user may use the electronic pen and RF pad electronics to enter and transmit an image of his handwritten signature to his financial institution for instantaneous verification. The user will enter his PIN (2222) and will press <Enter> key 92 to confirm his selection.

While the foregoing has been with reference to particular embodiments of the invention, it will be appreciated by those skilled in the art that changes in this embodiment may be made without departing from the principles and spirit of the invention, the scope of which is defined by the appended claims.

We claim:

1. A device for storing and communicating data about a financial transaction, comprising:

means for receiving numberical information about a financial transaction input by a user;

means for capturing an image of alphabetic data relating to the financial transaction written on a writing surface associated with the device;

means for storing the image and the information about the financial transaction in a transaction record;

means for communicating the transaction record to a computer system, said means comprising an infrared communications system, said infrared communications system further comprising a transmit light emitting diode for transmitting the transaction record from the device to the computer system and a receive photodiode for receiving data from the computer system; and further comprising a counter in the device for determining a next number for a next financial transaction.

2. A system for storing data about a financial transaction, comprising:

a device, comprising means for receiving numerical information about a financial transaction input by a users means for capturing an image of alphabetic data relating to the financial transaction written on a writing surface associated with the device, means for storing the image and the information about the financial transaction in a transaction record;

a computer system comprising means for receiving the transaction record from the device and means for generating a summary of the financial transaction of the user based on the transaction record received from the device; and said device further comprises an infrared communications system for communicating the transaction record to said computer system said infrared communications system comprising a transmit light emitting diode for transmitting the transaction record from the device to the computer system and a receive photodiode for receiving data from the computer system, and further comprising a counter in the device for determining the next number for a next financial transaction.

3. A method for storing data about a financial transaction, comprising:

receiving numerical information about a financial transaction input by a user;

capturing an image of alphabetic data relating to the financial transaction written on a writing surface associated with a device;

storing the image and the information about the financial transaction in a transaction record;

receiving the transaction record from the device at a computer system; and generating a summary of the financial transaction of the user based on the transaction record received from said device, said device comprises using an infrared communications system for communicating the transaction record to the computer system, said infrared communications system comprising using a transmit light emitting diode for transmitting the transaction record from the device to the computer system and a receive photodiode for receiving data from the computer system, and wherein said device further comprises using a counter in the device for determining a next number for a next financial transaction.

4. A method of claim 3, wherein the computer system comprises one of a personal computer, an automatic teller machine and a point of sale terminal.

5. The method of claim 4, wherein further comprises storing data about one or more financial transactions, reconciling the financial transactions, synchronizing the data between the device and the computer system, electronically paying a bill, and generating a report of the financial transaction.

* * * * *